(12) United States Patent
Nakamura

(10) Patent No.: US 11,960,074 B2
(45) Date of Patent: *Apr. 16, 2024

(54) OPTICAL FILTER AND ELECTRONIC APPARATUS

(71) Applicant: Seiko Epson Corporation, Tokyo (JP)

(72) Inventor: Tomoaki Nakamura, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 341 days.

This patent is subject to a terminal disclaimer.

(21) Appl. No.: 16/924,356

(22) Filed: Jul. 9, 2020

(65) Prior Publication Data

US 2021/0011276 A1 Jan. 14, 2021

(30) Foreign Application Priority Data

Jul. 10, 2019 (JP) .............................. JP2019-128417

(51) Int. Cl.
*G02B 26/00* (2006.01)
*G01J 3/02* (2006.01)

(52) U.S. Cl.
CPC .......... *G02B 26/001* (2013.01); *G01J 3/0229* (2013.01)

(58) Field of Classification Search
CPC ...... G02B 6/29358; G02B 26/001; G01J 3/26
See application file for complete search history.

(56) References Cited

U.S. PATENT DOCUMENTS

| 4,553,816 A | 11/1985 | Durand et al. | |
|---|---|---|---|
| 2009/0236525 A1* | 9/2009 | Mitra | G01J 3/2823 356/519 |
| 2012/0044492 A1 | 2/2012 | Matsushita et al. | |
| 2012/0206731 A1 | 8/2012 | Sano et al. | |
| 2014/0078503 A1 | 3/2014 | Matsushita et al. | |
| 2014/0320854 A1 | 10/2014 | Matsushita et al. | |
| 2018/0172510 A1* | 6/2018 | Rosen | G01J 3/0205 |

FOREIGN PATENT DOCUMENTS

| CN | 101047463 A | 10/2007 |
|---|---|---|
| CN | 102375172 A | 3/2012 |
| CN | 103676136 A | 3/2014 |
| JP | 2006-350125 A | 12/2006 |
| JP | 2012-042784 A | 3/2012 |
| JP | 2012-108370 A | 6/2012 |

(Continued)

*Primary Examiner* — Kimberly N. Kakalec
(74) *Attorney, Agent, or Firm* — Harness, Dickey & Pierce, P.L.C.

(57) ABSTRACT

An optical filter includes a pair of reflection films facing each other via a gap, and a gap change portion that changes a distance between the pair of reflection films, wherein the reflection film is formed by a plurality of layered structures, the plurality of layered structures are respectively formed by alternate stacking of high-refractive layers and low-refractive layers having smaller refractive indices than the high-refractive layers and, in the respective layered structures, optical film thicknesses of the high-refractive layers and optical film thicknesses of the low-refractive layers are film thicknesses based on predetermined design center wavelengths set with respect to each of the layered structures, and the design center wavelengths are different with respect to each of the layered structures.

6 Claims, 12 Drawing Sheets

(56) References Cited

FOREIGN PATENT DOCUMENTS

| | | |
|---|---|---|
| JP | 2012-168438 A | 9/2012 |
| JP | 2013-083685 A | 5/2013 |
| JP | 2014-059250 A | 4/2014 |
| JP | 2015-018280 A | 1/2015 |
| JP | 2018-112750 A | 7/2018 |

* cited by examiner

FIG. 6
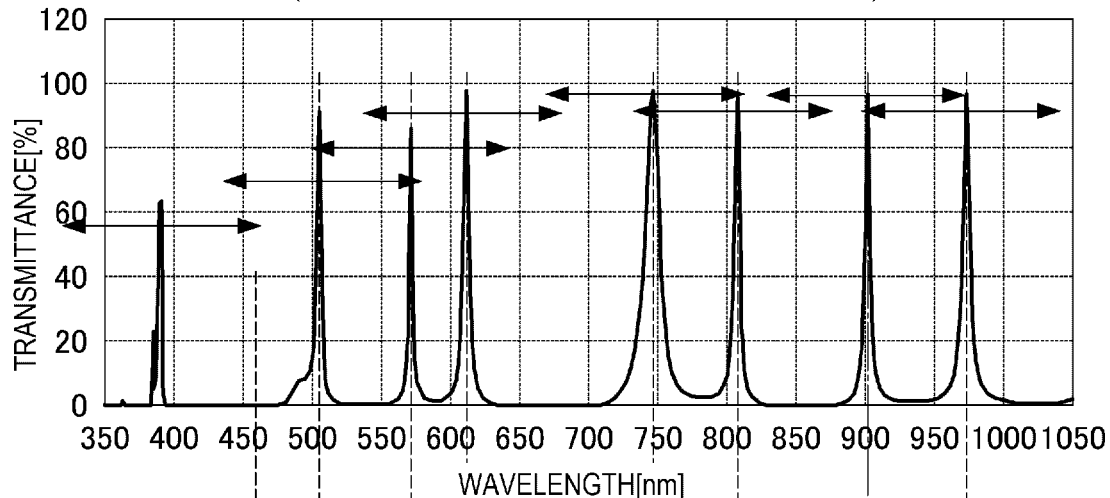
(OPTICAL CHARACTERISTICS OF FIRST FILTER)
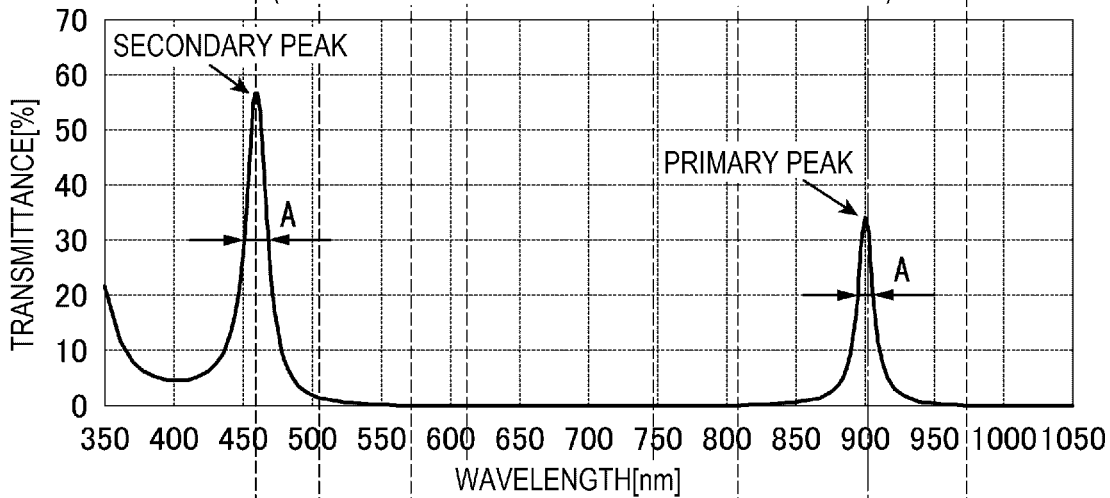
(OPTICAL CHARACTERISTICS OF SECOND FILTER)
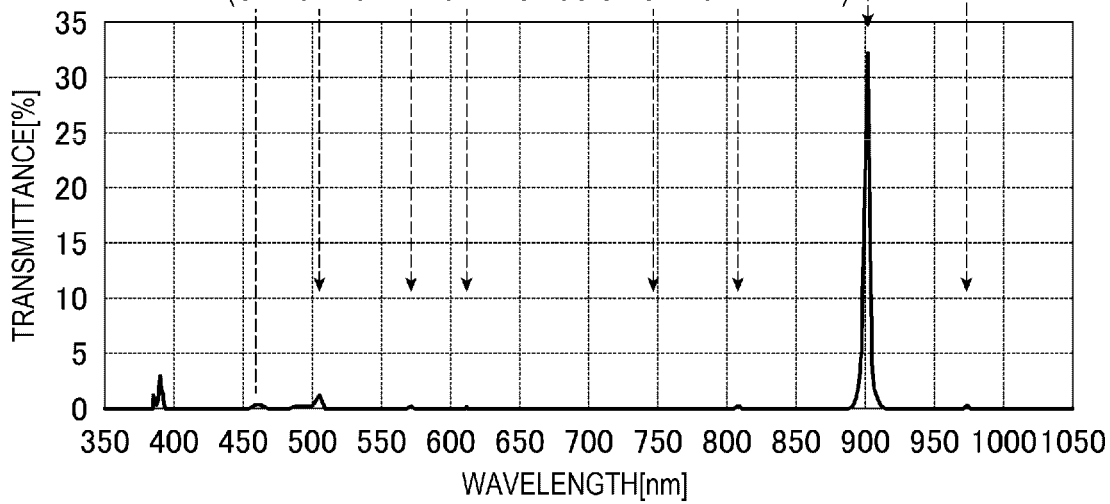
(OPTICAL CHARACTERISTICS OF OPTICAL FILTER)

US 11,960,074 B2

OPTICAL FILTER AND ELECTRONIC APPARATUS

The present application is based on, and claims priority from JP Application Serial Number 2019-128417, filed Jul. 10, 2019, the disclosure of which is hereby incorporated by reference herein in its entirety.

BACKGROUND

1. Technical Field

The present disclosure relates to an optical filter and electronic apparatus.

2. Related Art

In related art, Fabry-Perot optical filters (wavelength-tunable interference filters) are known (for example, see JP-A-2018-112750).

The wavelength-tunable interference filter disclosed in JP-A-2018-112750 is a filter in which a fixed mirror provided on a fixed substrate and a movable mirror provided on a movable substrate are placed to face each other via a gap. In the wavelength-tunable interference filter, the gap dimension between the fixed mirror and the movable mirror can be varied using an electrostatic actuator. The gap dimension is changed, and thereby, light transmitted through the wavelength-tunable interference filter changes.

Further, in the wavelength-tunable interference filter in JP-A-2018-112750, mirrors using dielectric multilayer films, mirrors using metal alloy films, mirrors using metal films are exemplified as the fixed mirror and the movable mirror.

However, in an optical filter like that in JP-A-2018-112750 and an electronic apparatus such as a measuring apparatus including the optical filter, there is a problem that it is hard to realize both a wider measurement wavelength range in which measurements can be performed and higher spectroscopic measurement accuracy. That is, in the optical filter like that in JP-A-2018-112750, when dielectric multilayer films are used as the fixed mirror and the movable mirror, a light at a target wavelength may be transmitted with higher wavelength resolution, however, there is a problem that the measuring wavelength range that can be spectroscopically separated is narrower. On the other hand, when metal alloy films or metal films are used as the fixed mirror and the movable mirror, a wide wavelength range from a visible light range to an infrared range can be spectroscopically separated, however, there is a problem that the wavelength resolution is lower than that of the dielectric multilayer films and the spectroscopic measurement accuracy is lower.

SUMMARY

An optical filter according to a first application example includes a pair of reflection films facing each other via a gap, and a gap change portion that changes a distance between the pair of reflection films, wherein the reflection film is formed by a plurality of layered structures, the plurality of layered structures are respectively formed by alternate stacking of high-refractive layers and low-refractive layers having smaller refractive indices than the high-refractive layers and, in the respective layered structures, optical film thicknesses of the high-refractive layers and optical film thicknesses of the low-refractive layers are film thicknesses based on predetermined design center wavelengths set with respect to each of the layered structures, and the design center wavelengths are different with respect to each of the layered structures.

In the optical filter according to the application example, the design center wavelengths of the plurality of layered structures may be shorter as the layered structures are closer to the gap.

In the optical filter according to the application example, the plurality of layered structures may be coupled by light-transmissive coupling layers, and optical film thicknesses of the coupling layers may be film thicknesses based on averages of the design center wavelengths of pairs of the layered structures with the coupling layers in between.

An optical filter according to a second application example includes a pair of reflection films facing each other via a gap, and a gap change portion that changes a distance between the pair of reflection films, wherein the reflection film is formed by a multilayer film in which high-refractive layers and low-refractive layers are alternately stacked, and optical film thicknesses of the respective layers of the high-refractive layers and the low-refractive layers are film thicknesses based on design center wavelengths different with respect to each of the layers, and the design center wavelengths are smaller toward the gap.

In the optical filter according to the application example, a difference between the design center wavelengths of the adjacent layers may take a constant value.

In the optical filter according to the first application example and the second application example, a wavelength range setting filter that transmits a light in a predetermined wavelength range may be provided on an optical axis of the pair of reflection films.

In the optical filter according to the first application example and the second application example, the wavelength range setting filter may include a pair of metal reflection films facing each other along the optical axis and a transmission wavelength range change portion that changes a dimension between the pair of metal reflection films.

An electronic apparatus according to a third application example includes the optical filter of the above described application example, and a control unit that controls the gap change portion.

BRIEF DESCRIPTION OF THE DRAWINGS

FIG. 6 shows an example of optical characteristics of an optical filter of the first embodiment.

DESCRIPTION OF EXEMPLARY EMBODIMENTS

First Embodiment

As below, the first embodiment will be explained.

Figure 1:
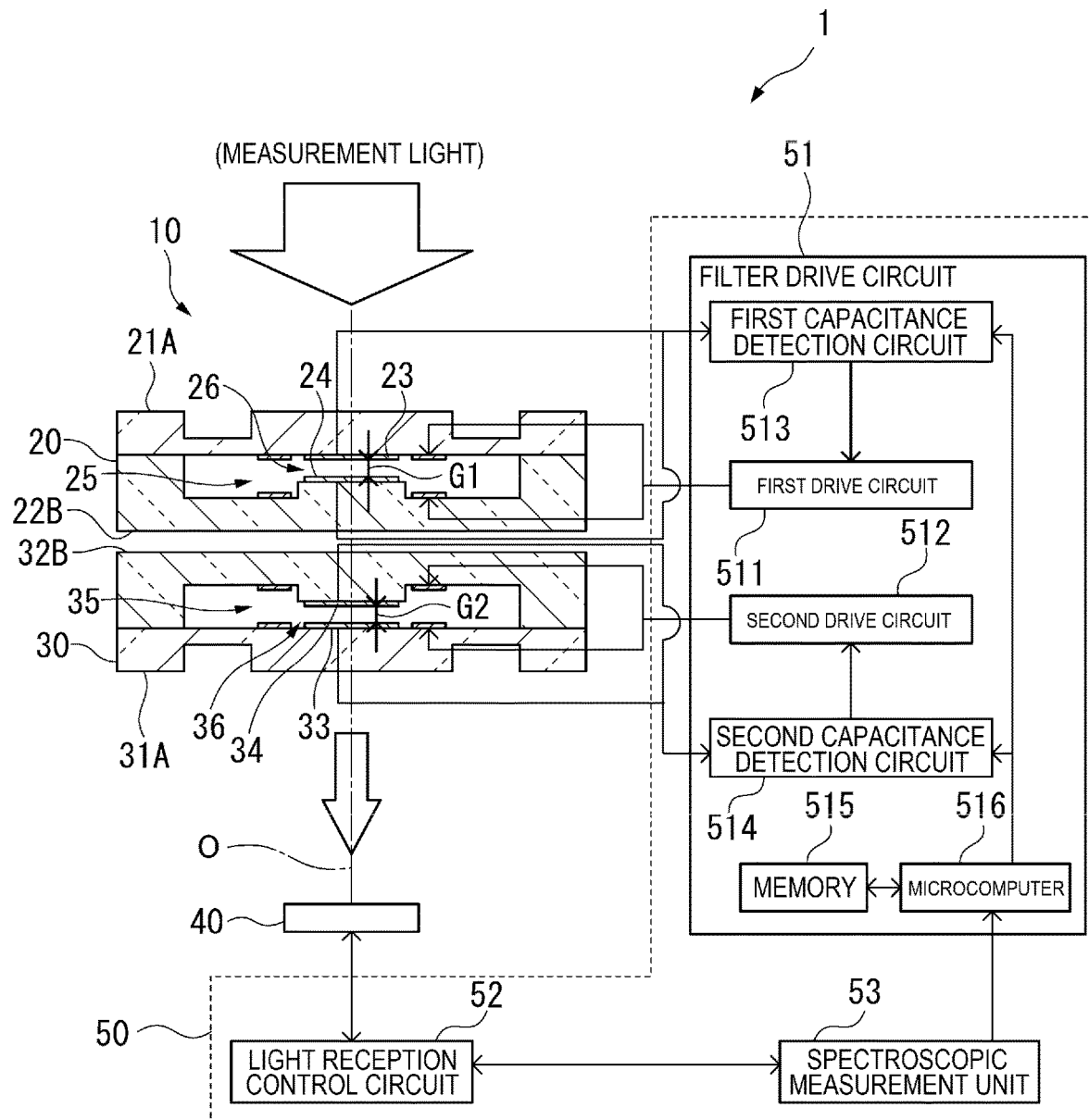
FIG. 1 shows a schematic configuration of a spectroscopic measuring apparatus of a first embodiment.

FIG. 1 shows the schematic configuration of a spectroscopic measuring apparatus 1 of the first embodiment.
Overall Configuration of Spectroscopic Measuring Apparatus 1

The spectroscopic measuring apparatus 1 is an electronic apparatus that measures an optical spectrum, chromaticity, etc. of a measuring object by spectroscopic separation of a measurement light entered from the measuring object. As shown in FIG. 1, the spectroscopic measuring apparatus 1 includes an optical filter 10, a light receiving unit 40, and a control unit 50.

Further, as shown in FIG. 1, the optical filter 10 includes a first filter 20 and a second filter 30.
Configuration of First Filter 20

Figure 2:
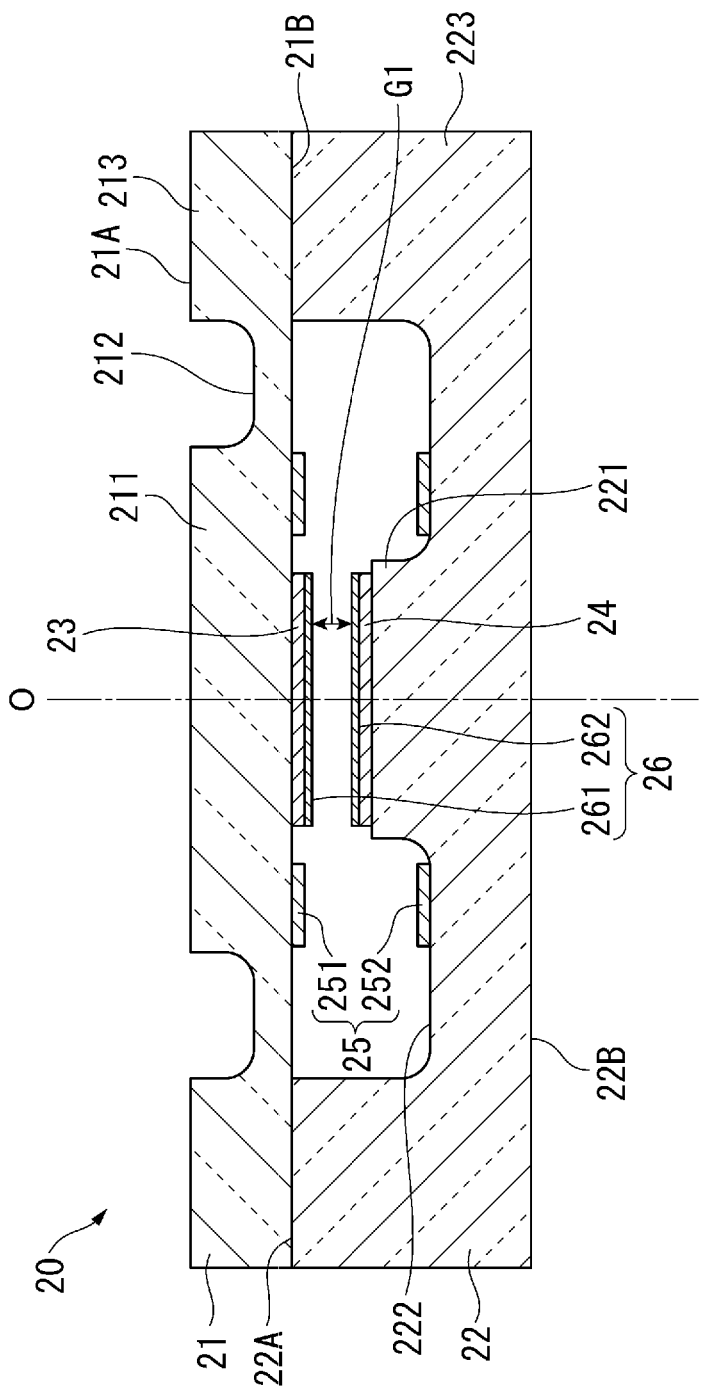
FIG. 2 is a sectional view schematically showing a schematic configuration of a first filter of the first embodiment.

FIG. 2 is the sectional view schematically showing the schematic configuration of the first filter 20.

The first filter 20 is a Fabry-Perot wavelength-tunable interference filter, and includes a light-transmissive first substrate 21 and a light-transmissive second substrate 22. The first substrate 21 and the second substrate 22 are placed along an optical axis O of the light receiving unit 40.

A first reflection film 23 as one of a pair of reflection films is provided on the first substrate 21, and a second reflection film 24 as the other of the pair of reflection films is provided on the second substrate 22. Further, the first filter 20 includes a first actuator 25 as an electrostatic actuator that changes the dimension between the first reflection film 23 and the second reflection film 24. The first actuator 25 includes a first electrode 251 provided on the first substrate 21 and a second electrode 252 provided on the second substrate 22 and forms a gap change portion.

The first substrate 21 has a first surface 21A that the measurement light enters and a second surface 21B facing the second substrate 22. In the first substrate 21, the first surface 21A is etched, and thereby, a diaphragm portion 212 as a substantially annular concave groove is formed. Further, a region surrounded by the diaphragm portion 212 forms a movable portion 211. The movable portion 211 is held movably in a direction from the first substrate 21 to the second substrate 22 by the diaphragm portion 212.

The first reflection film 23 is provided on the second surface 21B of the movable portion 211. The detailed configuration of the first reflection film 23 will be described later.

At a side of a first gap G1 of the first reflection film 23, a first detection electrode 261 as a transparent electrode is provided. For the transparent electrode, e.g. IGO, ITO, or the like may be used.

On the second surface 21B of the first substrate 21, the first electrode 251 is placed to surround the first reflection film 23. The first electrode 251 may be provided on the movable portion 211 or the diaphragm portion 212. In the embodiment, the configuration in which the first electrode 251 is provided on the movable portion 211 is exemplified.

The outer side of the diaphragm portion 212 of the first substrate 21 forms an outer circumferential portion 213 having a larger thickness along the optical axis O than the diaphragm portion 212. The outer circumferential portion 213 is joined to the second substrate 22 via a joining member (not shown).

The second substrate 22 includes a third surface 22A facing the first substrate 21 and a fourth surface 22B facing the second filter 30.

In the second substrate 22, the third surface 22A is processed by etching or the like, and thereby, a mirror mount 221 facing the movable portion 211, a groove portion 222 provided outside of the mirror mount 221, and a base portion 223 provided outside of the groove portion 222 are formed.

The mirror mount 221 is a part on which the second reflection film 24 facing the first reflection film 23 via the first gap G1 is provided.

At the first gap G1 side of the second reflection film 24, a second detection electrode 262 as a transparent electrode is provided. The second detection electrode 262 faces the first detection electrode 261 via the first gap G1 and forms a first capacitance detection unit 26 with the first detection electrode 261. That is, in the embodiment, electric charge held in the first detection electrode 261 and the second detection electrode 262 changes, and thereby, the dimension of the first gap G1 can be detected.

The groove portion 222 is a part provided to face the first electrode 251, in which the second electrode 252 placed to face the first electrode 251 is placed. As described above, the second electrode 252 forms the first actuator 25 with the first electrode 251 and, when a drive voltage between the first electrode 251 and the second electrode 252 is applied thereto, displaces the movable portion 211 toward the second substrate 22 side by an electrostatic attractive force.

The base portion 223 is a part joined to the outer circumferential portion 213 of the first substrate 21 via a joining member.

Note that, in the first filter 20, drive terminals (not shown) electrically coupled to the respective first electrode 251 and second electrode 252 of the first actuator 25 and detection terminals (not shown) electrically coupled to the respective first detection electrode 261 and second detection electrode 262 are provided. These terminals are coupled to the control unit 50 and application of the drive voltage to the first actuator 25 and detection of the dimension of the first gap G1 using the capacitance detection unit are performed under control by the control unit 50.
Configurations of First Reflection Film 23 and Second Reflection Film 24

Figure 3:
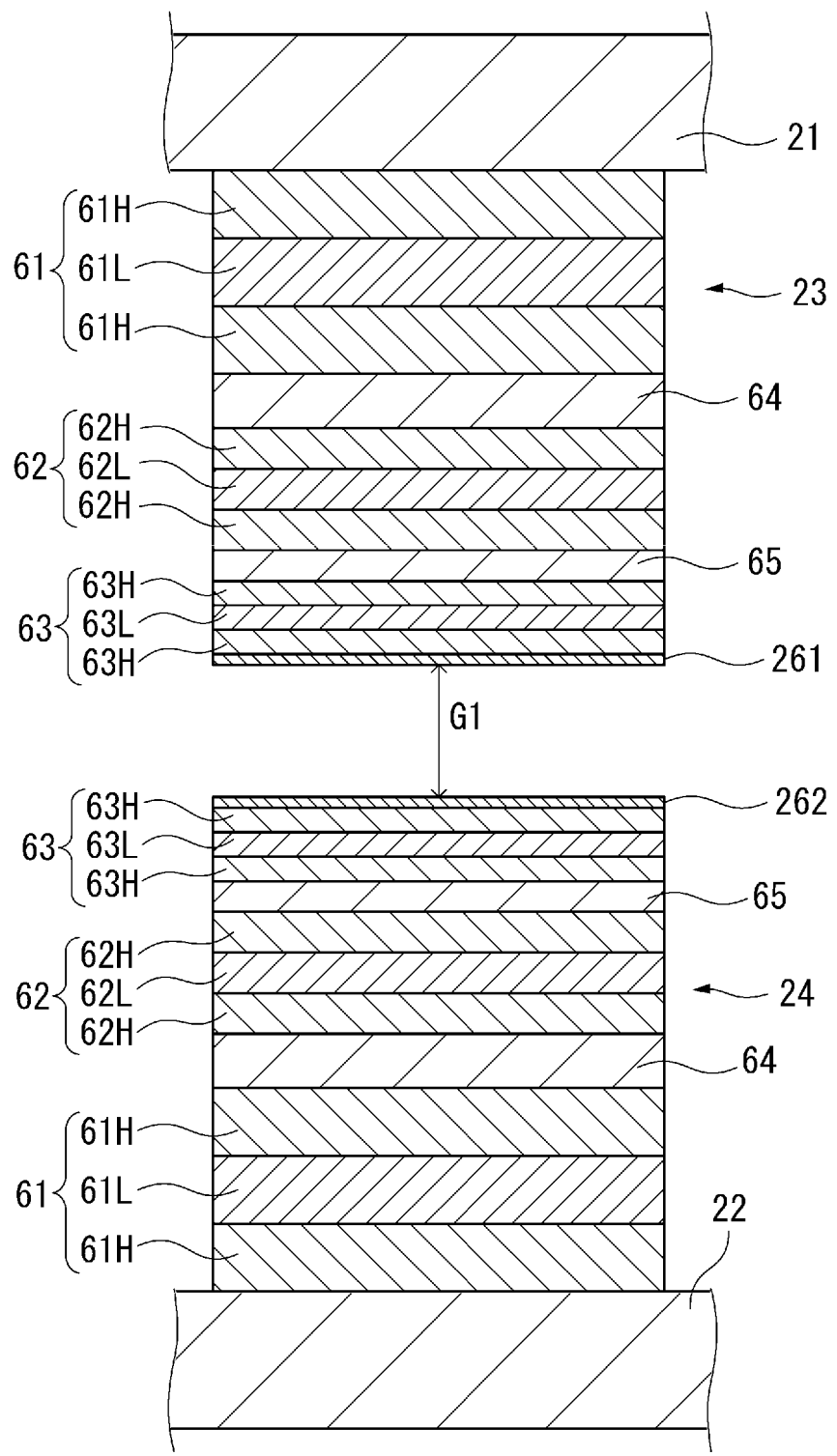
FIG. 3 is a sectional view schematically showing a reflection film configuration of the first filter of the first embodiment.

FIG. 3 shows schematic configurations of the first reflection film 23 and the second reflection film 24 in the first filter 20 of the first embodiment.

As shown in FIG. 3, the first reflection film 23 and the second reflection film 24 are formed by stacking of pluralities of optical layers.

Specifically, the first reflection film 23 is formed by stacking of a plurality of layered structures from the first substrate 21 toward the first gap G1. Further, the second reflection film 24 has the same configuration as the first reflection film 23 and is formed by stacking of a plurality of layered structures from the second substrate 22 toward the first gap G1.

In the example shown in FIG. 3, as the plurality of structures, a first layered structure 61, a second layered structure 62, and a third layered structure 63 are provided. The first layered structure 61 is a layered structure stacked on the first substrate 21 or the second substrate 22. The third layered structures 63 are layered structures placed in positions closest to the first gap G1 in the first reflection film 23 and the second reflection film 24. The second layered structure 62 is a layered structure placed between the first layered structure 61 and the third layered structure 63.

Note that, in the example in FIG. 3, as described above, the example in which each of the first reflection film 23 and the second reflection film 24 is formed to include the three layered structures, however, the reflection film may include four or more layered structures or two layered structures.

Each of these layered structures is formed by alternate stacking of high-refractive layers and a low-refractive layer. For example, in the first layered structure 61, a first high-refractive layer 61H, a first low-refractive layer 61L, and the first high-refractive layer 61H are sequentially alternately stacked from the first substrate 21 or the second substrate 22. Similarly, in the second layered structure 62, a second high-refractive layer 62H, a second low-refractive layer 62L, and the second high-refractive layer 62H are sequentially alternately stacked from the first layered structure 61 side, and, in the third layered structure 63, a third high-refractive layer 63H, a third low-refractive layer 63L, and the third high-refractive layer 63H are sequentially alternately stacked from the second layered structure 62 side.

In the following explanation, a refractive index of the first high-refractive layer 61H is $n_{1H}$, a thickness of the first high-refractive layer 61H is $d_{1H}$, a refractive index of the first low-refractive layer 61L is $n_{1L}$, and a thickness of the first low-refractive layer 61L is $d_{1L}$. A refractive index of the second high-refractive layer 62H is $n_{2H}$, a thickness of the second high-refractive layer 62H is $d_{2H}$, a refractive index of the second low-refractive layer 62L is $n_{2L}$, and a thickness of the second low-refractive layer 62L is $d_{2L}$. A refractive index of the third high-refractive layer 63H is $n_{3H}$, a thickness of the third high-refractive layer 63H is $d_{3H}$, a refractive index of the third low-refractive layer 63L is $n_{3L}$, and a thickness of the third low-refractive layer 63L is $d_{3L}$.

Here, the first layered structure 61 is a dielectric multilayer film that reflects a light around a first design center wavelength $\lambda_1$. That is, the optical film thicknesses (first optical film thicknesses) of the first high-refractive layer 61H and the first low-refractive layer 61L in the first layered structure 61 are the same film thickness. Specifically, the first high-refractive layer 61H and the first low-refractive layer 61L have the first optical film thickness that satisfies $n_{1H} \times d_{1H} = n_{1L} \times d_{1L} = \lambda_1/4$.

The second layered structure 62 is a dielectric multilayer film that reflects a light around a second design center wavelength $\lambda_2$. That is, the optical film thicknesses (second optical film thicknesses) of the second high-refractive layer 62H and the second low-refractive layer 62L in the second layered structure 62 are the same film thickness. Specifically, the second high-refractive layer 62H and the second low-refractive layer 62L have the second optical film thickness that satisfies $n_{2H} \times d_{2H} = n_{2L} \times d_{2L} = \lambda_2/4$. Here, the second design center wavelength $\lambda_2$ satisfies a relationship $\lambda_1 > \lambda_2$.

Similarly, the third layered structure 63 is a dielectric multilayer film that reflects alight around a third design center wavelength $\lambda_3$. That is, the optical film thicknesses (third optical film thicknesses) of the third high-refractive layer 63H and the third low-refractive layer 63L in the third layered structure 63 are the same film thickness. Specifically, the third high-refractive layer 63H and the third low-refractive layer 63L have the third optical film thickness that satisfies $n_{3H} \times d_{3H} = n_{3L} \times d_{3L} = \lambda_3/4$. Here, the third design center wavelength $\lambda_3$ satisfies a relationship $\lambda_1 > \lambda_2 > \lambda_3$.

The first design center wavelength $\lambda_1$, the second design center wavelength $\lambda_2$, and the third design center wavelength $\lambda_3$ are set according to a wavelength range as a measuring object by the spectroscopic measuring apparatus 1 (hereinafter, referred to as "measurement wavelength range"). For example, when the object wavelength range is set from the visible light range to the near-infrared light range (400 nm to 1000 nm), $\lambda_1=1000$ nm, $\lambda_2=650$ nm, and $\lambda_3=400$ nm are set. Note that the example in which the wavelength interval between the first design center wavelength $\lambda_1$ and the second design center wavelength $\lambda_2$ is larger than the wavelength interval between the second design center wavelength $\lambda_2$ and the third design center wavelength $\lambda_3$ is shown, however, the configuration is not limited to that. For example, the wavelength interval between the first design center wavelength $\lambda_1$ and the second design center wavelength $\lambda_2$ may be equal to the wavelength interval between the second design center wavelength $\lambda_2$ and the third design center wavelength $\lambda_3$. As will be described later in detail, in the first filter 20 of the embodiment, a light containing a plurality of peak wavelengths in the measurement wavelength range is transmitted. The wavelength interval between the first design center wavelength $\lambda_1$ and the second design center wavelength $\lambda_2$ and the wavelength interval between the second design center wavelength $\lambda_2$ and the third design center wavelength $\lambda_3$ may be set so that the intervals between these peak wavelengths may be substantially uniform.

The first layered structure 61 and the second layered structure 62 are coupled via a light-transmissive first coupling layer 64. The second layered structure 62 and the third layered structure 63 are coupled via a light-transmissive second coupling layer 65.

The first coupling layer 64 has a refractive index $n_4$ and a film thickness $d_4$, and the optical film thickness of the first coupling layer 64 is a film thickness based on the average of the first design center wavelength and the second design center wavelength. That is, when the design center wavelength of the first coupling layer 64 is $\lambda_4$, the design center wavelength $\lambda_4$ is $\lambda_4=(\lambda_1+\lambda_2)/2$ and satisfies $n_4 \times d_4 = \lambda_4/4$.

The second coupling layer 65 has a refractive index $n_5$ and a film thickness $d_5$, and the optical film thickness of the second coupling layer 65 is a film thickness based on the average of the second design center wavelength and the third design center wavelength. That is, when the design center wavelength of the second coupling layer 65 is $\lambda_5$, the design center wavelength $\lambda_5$ is $\lambda_5=(\lambda_2+\lambda_3)/2$ and satisfies $n_5 \times d_5 = \lambda_5/4$.

The further explanation is made by taking specific examples. In the embodiment, in the first reflection film 23 and the second reflection film 24, the first high-refractive layer 61H, the second high-refractive layer 62H, and the third high-refractive layer 63H are formed using the same material e.g. $TiO_2$. Further, the first low-refractive layer 61L, the second low-refractive layer 62L, and the third low-refractive layer 63L are formed using the same material e.g. $SiO_2$.

In the embodiment, the layer of the first layered structure 61 placed closest to the second layered structure 62 side is the first high-refractive layer 61H and the layer of the second layered structure 62 placed closest to the first layered structure 61 side is the second high-refractive layer 62H. Similarly, the layer of the second layered structure 62 placed closest to the third layered structure 63 side is the second high-refractive layer 62H, and the layer of the third layered structure 63 placed closest to the second layered structure 62 is the third high-refractive layer 63H. In this case, it is preferable to use low-refractive layers e.g. $SiO_2$ as the first coupling layer 64 and the second coupling layer 65.

In this case, $n_{1H}=n_{2H}=n_{3H}$ and $n_{1L}=n_{2L}=n_{3L}=n_4=n_5$, and the first optical film thickness, the second optical film thickness, and the third optical film thickness may be set only by the thicknesses of the respective layers. For example, when $\lambda_1=1000$ nm, $\lambda_2=650$ nm, and $\lambda_3=400$ nm, the thickness of the first high-refractive layer 61H is $d_{1H}=105.3$ nm and the thickness of the first low-refractive layer 61L is $d_{1L}=169.8$ nm. The thickness of the second high-refractive layer 62H is $d_{2H}=68.5$ nm and the thickness of the second low-refractive layer 62L is $d_{2L}=110.4$ nm. The thickness of the third high-refractive layer 63H is $d_{3H}=42.1$ nm and the thickness of the third low-refractive layer 63L is $d_{3L}=67.9$ nm. Further, the thickness of the first coupling layer 64 may be obtained as $d_4=(d_{1L}+d_{2L})/2$ and is $d_4=140.1$ nm. Similarly, the thickness of the second coupling layer 65 may be obtained as $d_5=(d_{2L}+d_{3L})/2$ and is $d_5=89.2$ nm.

Note that the optical film thicknesses of the first detection electrode 261 provided on the first reflection film 23 and the second detection electrode 262 provided on the second reflection film 24 are sufficiently smaller than the optical film thicknesses of the respective layers forming the respective layered structures 61, 62, 63. For example, in the embodiment, the first detection electrode 261 and the second detection electrode 262 are formed using IGO and the optical film thicknesses thereof are 20 nm, and a film thickness of about 10 nm is formed.

Configuration of Second Filter

Figure 4:
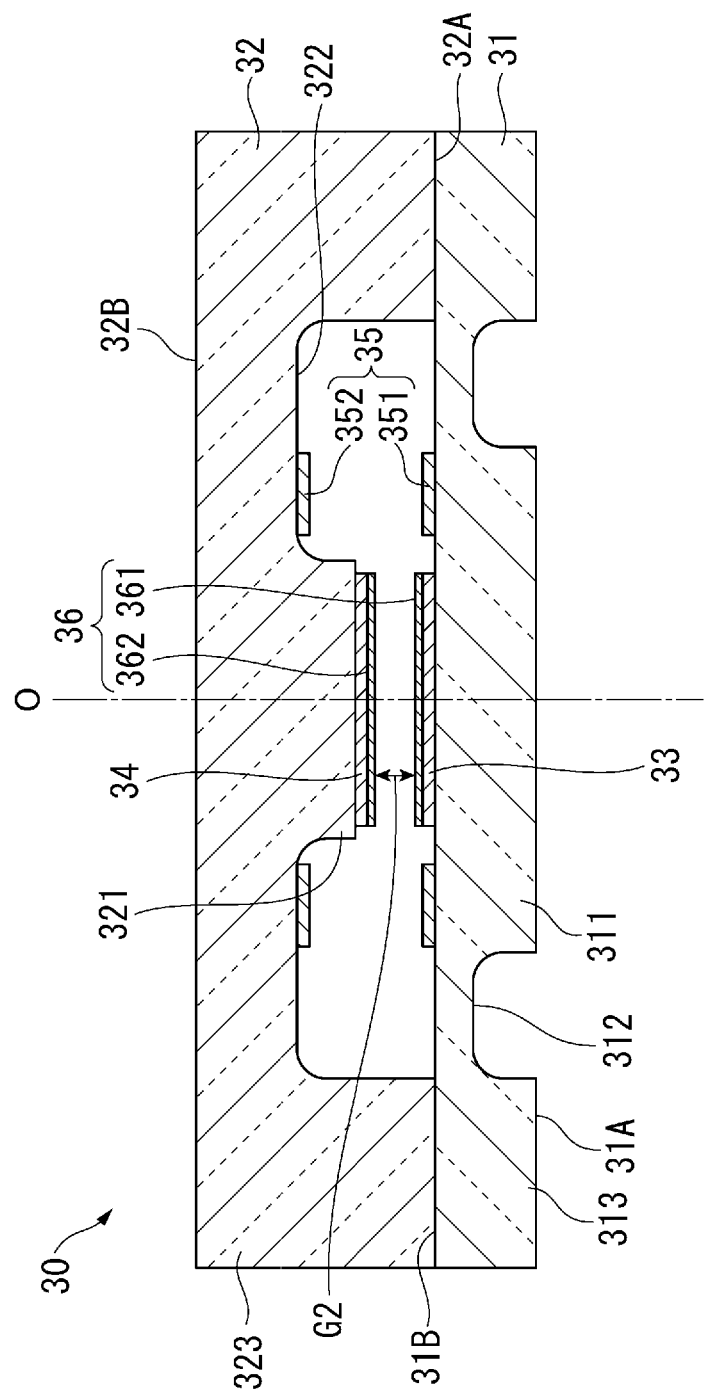
FIG. 4 is a sectional view schematically showing a schematic configuration of a second filter of the first embodiment.

FIG. 4 is the sectional view schematically showing the schematic configuration of the second filter 30.

The second filter 30 is a Fabry-Perot wavelength-tunable interference filter, and includes a light-transmissive third substrate 31 and a light-transmissive fourth substrate 32. These third substrate 31 and fourth substrate 32 are placed along the optical axis O of the light receiving unit 40. This second filter 30 is a wavelength range setting filter and transmits a light in a predetermined wavelength range from the transmitted light having the plurality of peak wavelengths transmitted through the first filter 20, and thereby, transmits only the light having the peak wavelength as a target wavelength.

A third reflection film 33 is provided on the third substrate 31 and a fourth reflection film 34 is provided on the fourth substrate 32. Further, the second filter 30 includes a second actuator 35 as an electrostatic actuator that changes the dimension between the third reflection film 33 and the fourth reflection film 34 like the first filter 20. The second actuator 35 includes a third electrode 351 provided on the third substrate 31 and a fourth electrode 352 provided on the fourth substrate 32.

The third substrate 31 has a fifth surface 31A at a side facing the light receiving unit 40 and a sixth surface 31B facing the fourth substrate 32. The third substrate 31 has substantially the same configuration as the first substrate 21. That is, in the third substrate 31, the fifth surface 31A is etched, and thereby, a second diaphragm portion 312 as a substantially annular concave groove and a second movable portion 311 surrounded by the second diaphragm portion 312 are formed. Further, the third reflection film 33 is provided on the sixth surface 31B of the second movable portion 311. The third reflection film 33 is formed using a metal reflection film. The metal reflection film here includes not only a metal film but also a metal alloy film. A third detection electrode 361 as a transparent electrode is provided on a surface of the third reflection film 33 facing the fourth substrate 32 like the first filter 20.

On the sixth surface 31B of the third substrate 31, the third electrode 351 forming the second actuator 35 is placed to surround the third reflection film 33. The second actuator 35 forms a transmission wavelength range change portion and changes a second gap G2 between the third reflection film 33 and the fourth reflection film 34, and thereby, changes the wavelength range of transmitted light transmitted through the second filter 30.

The outer side of the second diaphragm portion 312 of the third substrate 31 forms a second outer circumferential portion 313 having a larger thickness along the optical axis O than the second diaphragm portion 312 and is joined to the fourth substrate 32 via a joining member (not shown).

The fourth substrate 32 includes a seventh surface 32A facing the third substrate 31 and an eighth surface 32B facing the first filter 20.

In the fourth substrate 32, the seventh surface 32A is processed by etching or the like, and thereby, a second mirror mount 321, a second groove portion 322, and a second base portion 323 are formed like the second substrate 22.

The second mirror mount 321 is a part on which the fourth reflection film 34 facing the third reflection film 33 via the second gap G2 is provided. The fourth reflection film 34 is formed using a metal film or metal alloy film like the third reflection film 33.

At the second gap G2 side of the fourth reflection film 34, a fourth detection electrode 362 as a transparent electrode is provided. The fourth detection electrode 362 faces the third detection electrode 361 via the second gap G2 and forms a second capacitance detection unit 36 with the third detection electrode 361. That is, in the embodiment, electric charge held in the third detection electrode 361 and the fourth detection electrode 362 changes, and thereby, the dimension of the second gap G2 can be detected.

The second groove portion 322 is provided to face the third electrode 351, in which the fourth electrode 352 is placed. As described above, the fourth electrode 352 forms the second actuator 35 with the third electrode 351 and displaces the second movable portion 311 toward the fourth substrate 32 side.

The second base portion 323 is a part joined to the second outer circumferential portion 313 of the third substrate 31 via a joining member.

Note that, in the second filter 30, drive terminals (not shown) electrically coupled to the respective third electrode 351 and fourth electrode 352 of the second actuator 35 and detection terminals (not shown) electrically coupled to the respective third detection electrode 361 and fourth detection electrode 362 are provided like the first filter 20. These terminals are coupled to the control unit 50 and application of the drive voltage to the second actuator 35 and detection of the dimension of the second gap G2 using the second capacitance detection unit 36 are performed under control by the control unit 50.

Note that, in the example shown in FIG. 1, the second substrate 22 and the fourth substrate 32 are placed apart for distinction between the first filter 20 and the second filter 30, however, the fourth surface 22B of the second substrate 22 and the eighth surface 32B of the fourth substrate 32 may be joined using a light-transmissive joining member.

Further, the second substrate 22 and the fourth substrate 32 may have the same configuration. That is, the second substrate 22 and the fourth substrate 32 may be formed by a single substrate, and the mirror mount 221 and the groove portion 222 may be provided on a surface of the substrate facing the first substrate 21 and the second mirror mount 321 and the second groove portion 322 may be provided on a surface of the substrate facing the third substrate 31.

Configuration of Light Receiving Unit 40

The light receiving unit 40 is a sensor that receives the light transmitted through the optical filter 10. As the light receiving unit 40, e.g. an image sensor such as a CCD or CMOS may be used. When receiving the light transmitted through the optical filter 10, the light receiving unit 40 outputs a light reception signal according to the amount of received light to the control unit 50.

Configuration of Control Unit 50

As shown in FIG. 1, the control unit 50 includes a filter drive circuit 51, a light reception control circuit 52, a spectroscopic measurement unit 53, etc.

The filter drive circuit 51 is a circuit that controls driving of the optical filter 10. The filter drive circuit 51 may be provided on a circuit board on which the optical filter 10 is placed or separately provided from the circuit board.

The filter drive circuit 51 includes a first drive circuit 511, a second drive circuit 512, a first capacitance detection circuit 513, a second capacitance detection circuit 514, a memory 515, and a microcomputer 516.

The first drive circuit 511 is a circuit that applies a first drive voltage to the first actuator 25 of the first filter 20 based on control by the microcomputer 516. More specifically, in the embodiment, when a first target voltage corresponding to the target wavelength is commanded from the microcomputer 516, the first drive circuit 511 drives the first actuator 25 based on the first target voltage. Further, the circuit feedback-controls the first drive voltage applied to the first actuator 25 so that the first gap G1 may take a target value corresponding to the target wavelength with reference to a detection signal according to the dimension of the first gap G1 detected by the first capacitance detection circuit 513.

The second drive circuit 512 is a circuit that applies a second drive voltage to the second actuator 35 of the second filter 30 based on the control by the microcomputer 516. Specifically, when a second target voltage corresponding to the target wavelength is commanded from the microcomputer 516, the second drive circuit 512 drives the second actuator 35 based on the second target voltage. Further, the circuit feedback-controls the second drive voltage applied to the second actuator 35 so that the second gap G2 may take a target value corresponding to the target wavelength with reference to a detection signal according to the dimension of the second gap G2 detected by the second capacitance detection circuit 514.

The first capacitance detection circuit 513 receives a detection signal according to the electric charge held in the first capacitance detection unit 26 of the first filter 20. The detection signal is a signal that changes according to the dimension of the first gap G1. Further, the first capacitance detection circuit 513 outputs the detection signal to the first drive circuit 511. Thereby, as described above, the feedback control is performed so that the first gap G1 may take the desired target value by the first drive circuit 511, and a light at the desired target wavelength can be transmitted from the first filter 20.

The second capacitance detection circuit 514 is like the first capacitance detection circuit 513, and receives a detection signal according to the electric charge held in the second capacitance detection unit 36 of the second filter 30 and outputs the detection signal to the second drive circuit 512. Thereby, as described above, feedback control is performed so that the second gap G2 may take the desired target value by the second drive circuit 512, and a light at the desired target wavelength can be transmitted from the second filter 30.

The memory 515 stores a driving table in which target wavelengths of lights to be transmitted from the optical filter 10, target values (first target values) of the first gap G1 corresponding to the target wavelengths, and target values (second target values) of the second gap G2 corresponding to the target wavelengths are recorded. Further, the memory 515 may store initial drive voltages corresponding to the respective target values.

When receiving a command to start a measurement from the spectroscopic measurement unit 53, the microcomputer 516 sets the target wavelength and controls the first drive circuit 511 and the second drive circuit 512 to perform a spectroscopic measurement. The command to start the measurement from the spectroscopic measurement unit 53 includes a command to perform spectroscopic measurements on the respective wavelengths with respect to a predetermined wavelength range at predetermined wavelength intervals, a measurement command on a single target wavelength, etc.

The light reception control circuit 52 includes a sampling circuit that samples the light reception signal output from the light receiving unit 40, an amplifier circuit that amplifies the light reception signal, an A/D conversion circuit that converts the light reception signal into a digital signal, etc. The light reception control circuit 52 signal-processes the light reception signal using these respective circuits and inputs the signal-processed light reception signal to the spectroscopic measurement unit 53.

For example, the spectroscopic measurement unit 53 issues a command to start a spectroscopic measurement to the filter drive circuit 51 and the light reception control circuit 52 according to an operation by a user. Then, the unit performs the spectroscopic measurement on the measuring object based on the light reception signal input from the light reception control circuit 52.

Note that, in the embodiment, the configuration in which the control unit 50 contains the spectroscopic measurement unit 53 is exemplified, however, for example, the spectroscopic measurement unit 53 may be provided separately from the spectroscopic measuring apparatus 1. In this case, for example, a computer such as a personal computer or tablet terminal communicably coupled to the spectroscopic measuring apparatus 1 may function as the spectroscopic measurement unit 53.

Spectroscopic Measuring Method of Spectroscopic Measuring Apparatus 1

Next, a spectroscopic measuring method using the spectroscopic measuring apparatus 1 of the embodiment and optical characteristics of the first filter 20 and the second filter 30 of the optical filter 10 will be explained.

Figure 5:
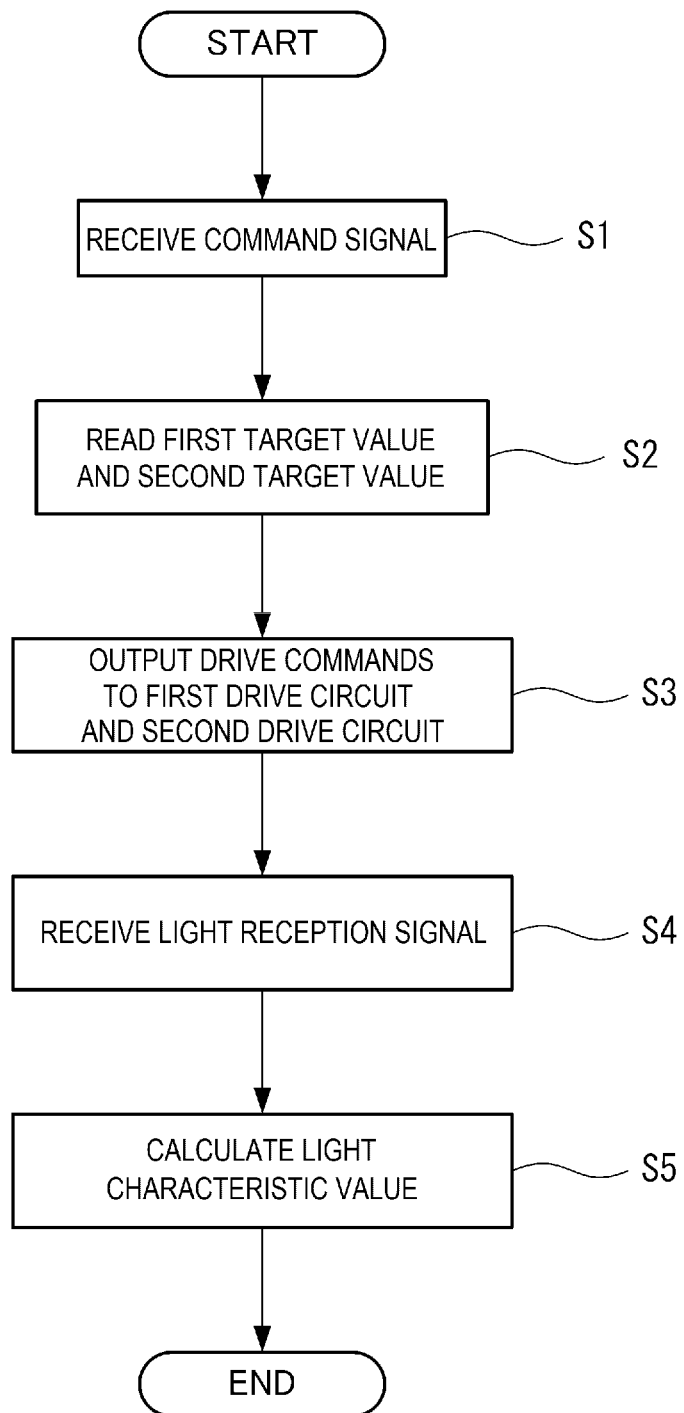
FIG. 5 is a flowchart showing a spectroscopic measuring method of the spectroscopic measuring apparatus of the first embodiment.

FIG. 5 is the flowchart showing the spectroscopic measuring method in the spectroscopic measuring apparatus 1 of the embodiment.

In the spectroscopic measuring apparatus 1 of the embodiment, for example, when an operation signal to perform the spectroscopic measurement processing is input to the spectroscopic measurement unit 53 by the user, a command signal to command the spectroscopic measurement is output from the spectroscopic measurement unit 53 to the filter drive circuit 51 and the light reception control circuit 52.

Here, as an example, a case where a command signal to perform the spectroscopic measurement processing with a specific single wavelength as the target wavelength is output is exemplified.

In the filter drive circuit 51, when receiving the command signal from the spectroscopic measurement unit 53 (step S1), the microcomputer 516 reads the first target value and the second target value corresponding to the target wavelength from the driving data in the memory 515 (step S2).

Then, the microcomputer 516 outputs a drive command to command driving based on the first target value to the first drive circuit 511, and outputs a drive command to command driving based on the second target value to the second drive circuit 512 (step S3).

Thereby, the first drive circuit 511 controls the first actuator 25 so that the first gap G1 input from the first capacitance detection circuit 513 may have a dimension according to the first target value. Further, the second drive circuit 512 controls the second actuator 35 so that the second gap G2 input from the second capacitance detection circuit 514 may have a dimension according to the second target value.

Here, the optical characteristics of the optical filter 10 of the embodiment is explained.

FIG. 6 shows the optical characteristics of the first filter 20, the optical characteristics of the second filter 30, and the optical characteristics of the light transmitted through the optical filter 10 in the embodiment.

The first filter 20 in the embodiment includes the first reflection film 23 and the second reflection film 24 formed by sequential stacking of the first layered structures 61, the second layered structures 62, and the third layered structures 63. The first filter 20 has a wider measurement wavelength range compared to a normal wavelength-tunable interference filter using dielectric multi layer films in which layer thicknesses of high-refractive layers and low-refractive layers are designed based on a single design center wavelength. That is, in the normal wavelength-tunable interference filter using the dielectric multi layer films, the measurement wavelength range is a narrower band range substantially from 100 nm to 200 nm, and spectroscopic characteristics are not obtained outside of the band range and lights are transmitted at higher transmittance. On the other hand, as shown in FIG. 6, the first filter 20 of the embodiment has spectroscopic characteristics for a wide measurement wavelength range over about 600 nm from the visible light range to the near-infrared range.

Further, the first filter 20 contains the plurality of peak wavelengths within the measurement wavelength range, and eight peak wavelengths appear in the example shown in FIG. 6. As shown in FIG. 6, the half-band widths of the transmitted lights at the respective peak wavelengths are narrower than those of the second filter 30 using the metal films or metal alloy films as the reflection films, and wavelengths around the peak wavelengths may be output with higher wavelength resolution. In the optical characteristics of the first filter 20 in FIG. 6, double-headed arrows show shift ranges of the respective peak wavelengths when the first gap G1 is changed. That is, these peak wavelengths entirely shift toward the short wavelength side when the dimension of the first gap G1 is reduced, and entirely shift toward the long wavelength side when the dimension of the first gap G1 is increased.

In the embodiment, in the first filter 20, the first gap G1 is set so that the target wavelength may be one of the plurality of peak wavelengths and, as shown in FIG. 6, the lights at the others of the plurality of peak wavelengths are transmitted through the first filter 20 at the same time. Accordingly, in the embodiment, the other lights than the light at the target wavelength are blocked and only the light at the target wavelength is transmitted by the second filter 30.

That is, in the embodiment, the microcomputer 516 sets the first target value and the second target value so that the peak wavelength may be the target wavelength in the first filter 20 and the second filter 30 and the other peak wavelengths may not overlap in the first filter 20 and the second filter 30. In this regard, the values are set so that a transmission wavelength range A around the peak wavelength transmitted through the second filter 30 may contain only one peak wavelength of the first filter 20.

For example, in the example shown in FIG. 6, the dimensions of the first gap G1 and the second gap G2 are set with the target wavelength at 900 nm. In this case, the second filter 30 transmits a light at 900 nm as a primary peak wavelength and transmits a light at nearly 450 nm as a secondary peak wavelength. On the other hand, in the first filter 20, when the first gap G1 is set so that the second peak wavelength from the long wavelength side may be 900 nm as the target wavelength, the light at 450 nm as the secondary peak wavelength in the second filter 30 is not transmitted through the first filter 20. Thereby, as shown in FIG. 6, the optical filter 10 may transmit the light at 900 nm as the target wavelength with the same half-band width as that of the first filter 20.

Figure 7:
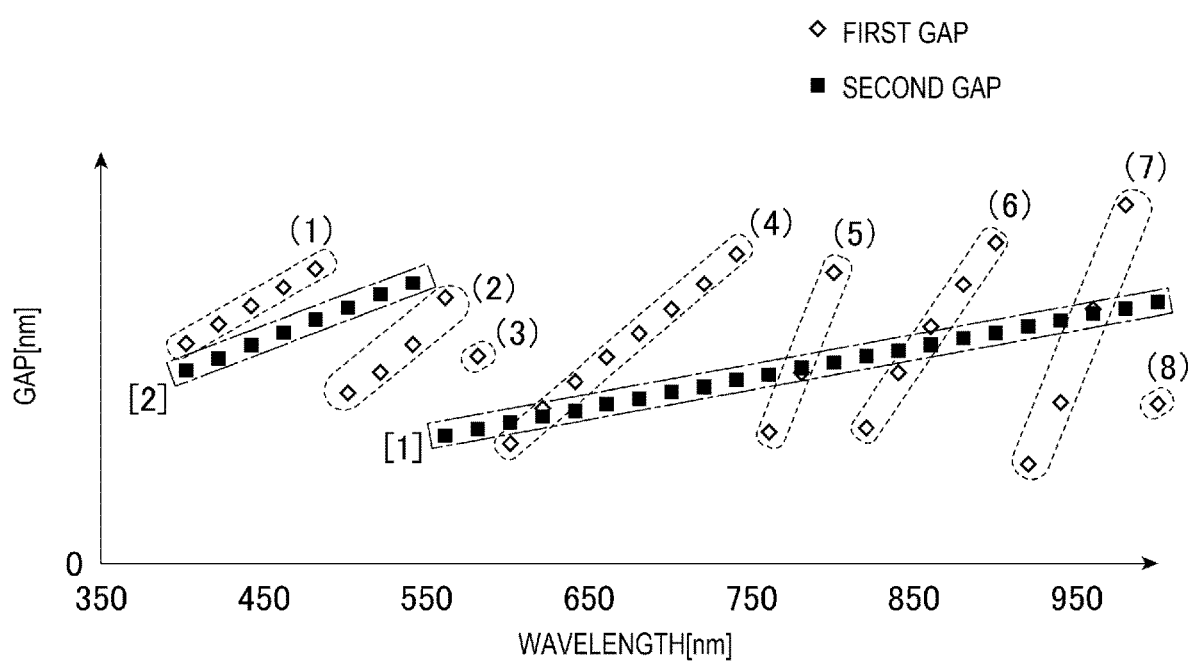
FIG. 7 shows setting examples of a first gap and a second gap with respect to target wavelengths in the optical filter of the first embodiment.

FIG. 7 shows relationships between the target wavelength and the dimensions of the first gap G1 and the second gap G2.

The numerals in parentheses for the portions surrounded by rectangles of dashed-dotted lines in FIG. 7 show the orders of the peak wavelengths for coincidence with the target wavelength in the second filter 30. That is, in the embodiment, in the second filter 30, the second target value is set so that the secondary peak wavelength may coincide with the target wavelength when a light at less than 550 nm is set as the target wavelength, and the primary peak wavelength may coincide with the target wavelength when a light at 550 nm or more is set as the target wavelength.

The numerals in brackets for the portions surrounded by ellipses of broken lines in FIG. 7 show the positions of the peak wavelengths for coincidence with the target wavelength from the short wavelength side in the first filter 20.

That is, as shown by (1) in FIG. 7, when a light at less than 480 nm is set as the target wavelength, the microcomputer 516 sets the first target value so that the peak wavelength at the shortest wavelength side of the eight peak wavelengths may coincide with the target wavelength. As shown by (2), when a light at 480 nm or more and less than 560 nm is set as the target wavelength, the microcomputer 516 sets the first target value so that the second shortest peak wavelength of the eight peak wavelengths may coincide with the target wavelength. As shown by (3), when a light at 560 nm or more and less than 580 nm is set as the target wavelength, the microcomputer 516 sets the first target value so that the third shortest peak wavelength may coincide with the target wavelength. As shown by (4), when a light at 580 nm or more and less than 740 nm is set as the target wavelength, the microcomputer 516 sets the first target value so that the fourth shortest peak wavelength may coincide with the target wavelength. As shown by (5), when a light at 740 nm or more and less than 780 nm is set as the target wavelength, the microcomputer 516 sets the first target value so that the fifth shortest peak wavelength may coincide with the target wavelength. As shown by (6), when a light at 780 nm or more and less than 880 nm is set as the target wavelength, the microcomputer 516 sets the first target value so that the sixth shortest peak wavelength may coincide with the target wavelength. As shown by (7), when a light at 880 nm or more and less than 980 nm is set as the target wavelength, the microcomputer 516 sets the first target value so that the seventh shortest peak wavelength may coincide with the target wavelength. As shown by (8), when a light at 980 nm or more is set as the target wavelength, the microcomputer 516 sets the first target value so that the longest peak wavelength may coincide with the target wavelength.

Note that the example shown in FIG. 7 is just an example and, with which peak wavelength the target value coincides may be appropriately set according to a condition such as the design center wavelengths of the respective layered structures of the first filter 20 or the like.

Returning to FIG. 5, after step S3, the spectroscopic measurement unit 53 receives the light reception signal output from the light reception control circuit 52 (step S4), and calculates a light characteristic value of the measuring object for the target wavelength based on the signal value of the light reception signal (step S5). For example, the spectroscopic measurement unit 53 calculates an amount of light, reflectance, or the like of the measuring object for the target wavelength. Note that, in the embodiment, only the spectroscopic measurement for the single wavelength is exemplified, however, for example, also when optical spectra for the respective wavelengths at predetermined intervals within the measurement wavelength range are calculated, the above described steps S1 to S5 may be repeatedly performed.

Functions and Effects of Embodiment

The optical filter 10 of the embodiment has the first filter 20. The first filter 20 includes the first reflection film 23 and the second reflection film 24 facing each other via the first gap G1 and the first actuator 25 that changes the dimension of the first gap G1. Further, the first reflection film 23 and the second reflection film 24 of the embodiment are formed by the first layered structures 61, the second layered structures 62, and the third layered structures 63. These layered structures 61, 62, 63 are respectively formed by alternate stacking of the high-refractive layers and the low-refractive layers. Further, in the respective layered structures 61, 62, 63, the optical film thicknesses of the high-refractive layers and the optical film thicknesses of the low-refractive layers are the film thicknesses based on the predetermined design center wavelengths $\lambda_1, \lambda_2, \lambda_3$ set with respect to each of the layered structures 61, 62, 63, and the design center wavelengths $\lambda_1, \lambda_2, \lambda_3$ are different with respect to each of the layered structures 61, 62, 63.

That is, in the first layered structure 61, the optical film thickness $n_{1H} \times d_{1H}$ of the first high-refractive layer 61H and the optical film thickness $n_{1L} \times d_{1L}$ of the first low-refractive layer 61L are set based on the first design center wavelength $\lambda_1$. In the second layered structure 62, the optical film thickness $n_{2H} \times d_{2H}$ of the second high-refractive layer 62H and the optical film thickness $n_{2L} \times d_{2L}$ of the second low-refractive layer 62L are set based on the second design center wavelength $\lambda_2$. In the third layered structure 63, the optical film thickness $n_{3H} \times d_{3H}$ of the third high-refractive layer 63H and the optical film thickness $n_{3L} \times d_{3L}$ of the third low-refractive layer 63L are set based on the third design center wavelength $\lambda_3$.

Thereby, the light at the peak wavelength according to the dimension of the first gap G1 may be transmitted from the first filter 20 and, as shown in FIG. 6, the peak wavelength appears in the wide range from the visible light range to the near-infrared range. Further, in the transmission characteristics of the lights at the respective peak wavelengths, the half-band widths are sufficiently small with respect to the transmission wavelength range A of the wavelength-tunable interference filter using the metal films as reflection films like the second filter 30 and the wavelength resolution is very high. Therefore, the optical filter 10 having the first filter 20 appropriately selects the plurality of peak wavelengths output from the first filter 20, and thereby, the light at the desired target wavelength may be spectroscopically separated and transmitted with high accuracy from the wide measurement wavelength range.

That is, in the wavelength-tunable interference filter of related art including the dielectric multilayer films having the optical film thicknesses set based on the single design center wavelength, for example, the single peak wavelength appears with respect to the narrow range from about 100 nm to 200 nm. Accordingly, it may be impossible for the wavelength-tunable interference filter of related art using the dielectric multilayer films to perform the measurement in e.g. the wide measurement wavelength range containing from the visible light range to the near-infrared range.

The measurement wavelength range may be widened by arrangement of a plurality of wavelength-tunable interference filters of related art in the direction of the optical axis O, however, in this case, the many wavelength-tunable interference filters are necessary. For example, when the wider measurement wavelength range of about 600 nm is set as in the embodiment, stacking of at least three or more wavelength-tunable interference filters is necessary and causes upsizing of the apparatus.

On the other hand, in the embodiment, the target wavelength can be set with respect to the wide measurement wavelength range and the light at the target wavelength with the narrow half-band width and high wavelength resolution can be transmitted by the single first filter 20.

In the optical filter 10 of the embodiment, the first design center wavelength $\lambda_1$ of the first layered structure 61, the second design center wavelength $\lambda_2$ of the second layered structure 62, and the third design center wavelength $\lambda_3$ of the third layered structure 63 are shorter as the structure is closer to the first gap G1.

That is, in the embodiment, $\lambda_1 > \lambda_2 > \lambda_3$ is satisfied and, thereby, the optical characteristics shown in FIG. 6 are obtained and the spectroscopic accuracy of the optical filter 10 may be increased.

Here, the effects of formation of the layered structures 61, 62, 63 that satisfy $\lambda_1 > \lambda_2 > \lambda_3$ are explained in comparison between the embodiment and a comparative example. As the comparative example, a wavelength-tunable interference filter (Comparative example 1) having the same configuration as the first filter 20, but, in which the first design center wavelength $\lambda_1$, the second design center wavelength $\lambda_2$, and the third design center wavelength $\lambda_3$ are set ($\lambda_1 < \lambda_2 < \lambda_3$) to be longer toward the first gap G1 as the first reflection film 23 and the second reflection film 24 is used.

Figure 8:
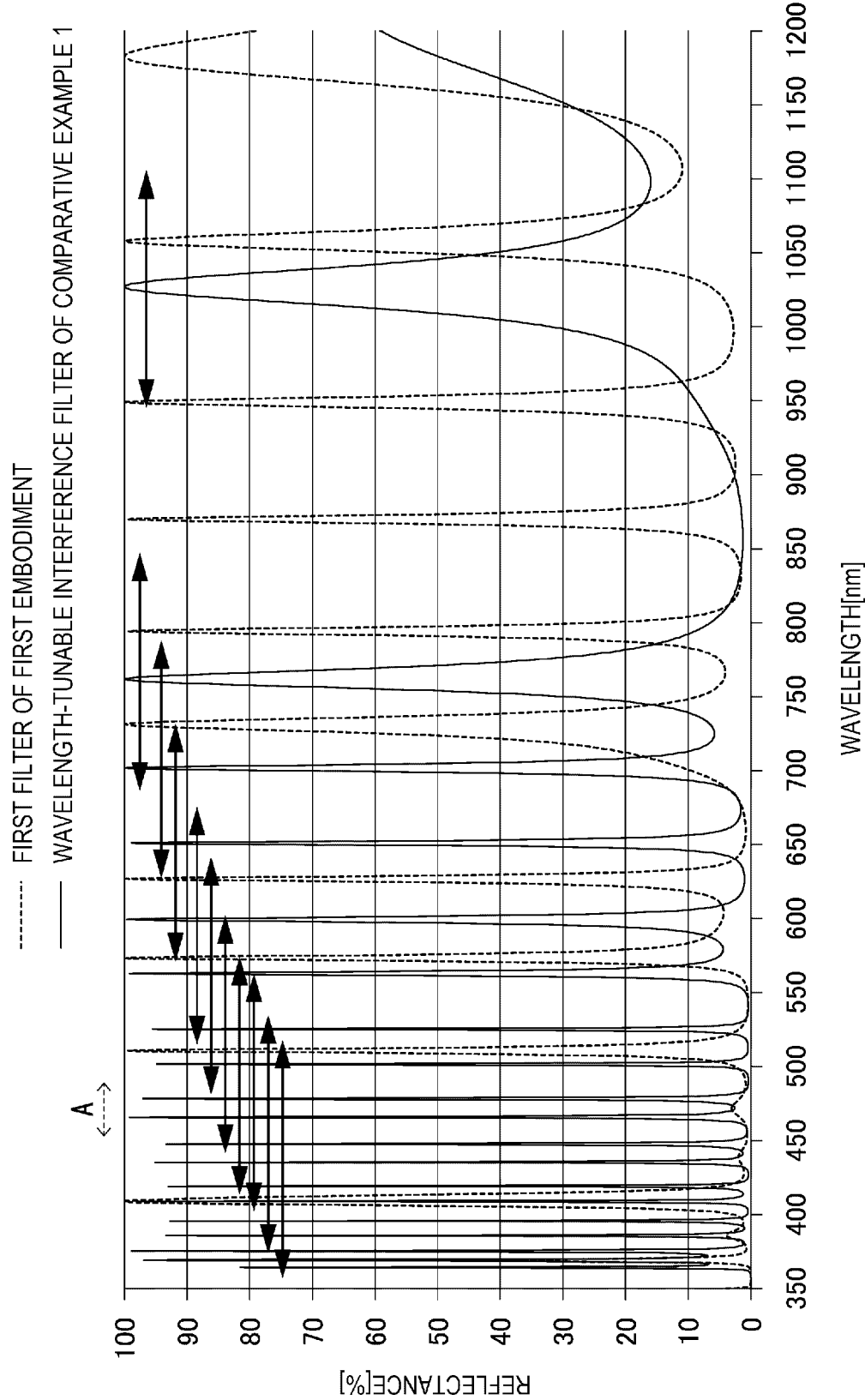
FIG. 8 shows optical characteristics of a wavelength-tunable interference filter of Comparative example 1.

FIG. 8 shows optical characteristics of the wavelength-tunable interference filter of Comparative example 1. Note that, in FIG. 8, the broken line shows the optical characteristics of the first filter 20 of the embodiment and the solid line shows the optical characteristics of the wavelength-tunable interference filter of Comparative example 1. The double-headed arrows in FIG. 8 show shift ranges of peak wavelengths when a gap between the reflection films of the wavelength-tunable interference filter of Comparative example 1 is changed. Further, a double-headed arrow of the broken line shows an example of the transmission wavelength range A at the peak wavelength of the second filter 30.

As shown in FIG. 8, in the wavelength-tunable interference filter of Comparative example 1, in the optical characteristics of the transmitted light, the half-band width in the peak wavelength at the long wavelength side is larger and the transmittance of the light in the wavelength range between the adjacent peak wavelengths is higher. That is, in Comparative example 1, the spectroscopic accuracy at the long wavelength side is reduced compared to that in the embodiment.

Further, in the wavelength-tunable interference filter of Comparative example 1, wavelength intervals between the plurality of peak wavelengths are larger at the long wavelength side than those when $\lambda_1 > \lambda_2 > \lambda_3$. Accordingly, there are wavelengths spectroscopically inseparable even when the gap between the reflection films is changed. Note that, if the shape of the first substrate 21 is designed so that the tunable distance of the first gap G1 may be larger, the amount of shift of the peak wavelength may be increased, however, in this case, upsizing of the wavelength-tunable interference filter is caused and a tilt or deflection of the movable portion is easily produced, and the spectroscopic accuracy is reduced.

Furthermore, in the wavelength-tunable interference filter of Comparative example 1, the intervals between the plurality of peak wavelengths at the short wavelength side are shorter than those of the embodiment. In this case, the transmission wavelength range A of the transmitted light around the peak wavelength of the second filter 30 contains the plurality of peak wavelengths. Therefore, the lights at the plurality of peak wavelengths are transmitted from the optical filter 10, and the spectroscopic accuracy is also reduced at the short wavelength side.

On the other hand, in the embodiment, as seen from a comparison between FIG. 8 and FIG. 6, the wavelength intervals between the peak wavelengths at the long wavelength side are smaller than those of Comparative example 1, and the wavelength intervals between the peak wavelengths at the short wavelength side are larger than those of Comparative example 1. That is, with respect to the measurement wavelength range, the wavelength intervals between the plurality of peak wavelengths appear substantially uniformly. Accordingly, it is not necessary to excessively increase the tunable distance of the first gap G1, and the first filter 20 is downsized. Further, the wavelength intervals between the respective peak wavelengths are larger than those of the transmission wavelength range A in the peak wavelength of the second filter 30, and thereby, inconvenience that the plurality of peak wavelengths are transmitted through the optical filter 10 may be suppressed. Therefore, the spectroscopic accuracy of the optical filter 10 may be increased compared to the case where $\lambda_1 > \lambda_2 > \lambda_3$ is set.

In the optical filter 10 of the embodiment, the first coupling layer 64 is placed between the first layered structure 61 and the second layered structure 62, and the second coupling layer 65 is placed between the second layered structure 62 and the third layered structure 63. Further, the optical film thickness $n_4 \times d_4$ of the first coupling layer 64 is the film thickness based on the average of the respective design center wavelengths (first design center wavelength $\lambda_1$ and second design center wavelength $\lambda_2$) of the first layered structure 61 and the second layered structure 62 placed with the first coupling layer 64 in between. The same applies to the second coupling layer 65, and the optical film thickness $n_5 \times d_5$ is the film thickness based on the average of the respective design center wavelengths (second design center wavelength $\lambda_2$ and third design center wavelength $\lambda_3$) of the second layered structure 62 and the third layered structure 63 placed with the second coupling layer 65 in between.

Thereby, the differences in design center wavelengths among the respective layered structures 61, 62, 63 may be averaged by the coupling layers 64, 65 and, as shown in FIG. 6, the optical characteristics in which the plurality of peak wavelengths are located nearly uniformly are obtained.

In the optical filter 10 of the embodiment, the second filter 30 as the wavelength range setting filter that transmits a light in a predetermined wavelength range is provided on the optical axis of the first filter 20, i.e., the optical axis of the light receiving unit 40. That is, the second filter 30 transmits the light in the predetermined wavelength range around the target wavelength.

Thereby, even when the lights at the plurality of peak wavelengths are transmitted from the first filter 20, only the light at the specific peak wavelength corresponding to the target wavelength may be transmitted from the optical filter 10.

Then, in the embodiment, the second filter 30 is the wavelength-tunable interference filter having the third reflection film 33 and the fourth reflection film 34 formed using the metal reflection films, and includes the second actuator 35 that changes the second gap G2 between the third reflection film 33 and the fourth reflection film 34.

The dimension of the second gap G2 is changed by the second actuator 35, and thereby, the wavelength range to be transmitted through the second filter 30 may be changed. Further, the second filter 30 is formed by the wavelength-tunable interference filter using the third reflection film 33 and the fourth reflection film 34 as the metal reflection films. In this case, the dimension of the second gap G2 is changed by the second actuator 35, and thereby, the peak wavelength of the transmitted light may be changed in the wide wavelength range from the visible light range to the near-infrared range. In the second actuator 35 using the metal reflection films, the transmitted light contains wavelength components of the wider wavelength range (transmission wavelength range A) around the peak wavelength. That is, the wavelength resolution of the second filter 30 is lower than that of the first filter 20. However, in the embodiment, the first filter 20 is provided, and thereby, the transmitted light with the narrow half-band width and high wavelength resolution may be transmitted from the optical filter 10.

Further, in the embodiment, the transmission wavelength range A of the second filter 30 is narrower than the wavelength intervals between the plurality of peak wavelengths in the first filter 20. Thereby, only the light at the peak wavelength corresponding to the desired target wavelength may be transmitted from the transmitted lights corresponding to the plurality of peak wavelengths output from the first filter 20.

The spectroscopic measuring apparatus 1 of the embodiment includes the optical filter 10 having the above described first filter 20 and second filter 30, and the control unit 50 controlling the first actuator 25 and the second actuator 35. Specifically, the control unit 50 controls the optical filter 10 by setting one of the plurality of peak wavelengths transmitted from the first filter 20 as the target wavelength, setting the transmitted peak wavelength of the second filter 30 as the target wavelength, and setting the target values of the first gap G1 and the second gap G2 so that the transmitted peak wavelengths of the other orders of the second filter 30 may not overlap with the other peak wavelengths than the target wavelength of the first filter 20.

Thereby, the light at the target wavelength transmitted through the first filter 20 and the second filter 30 may be transmitted with high wavelength resolution, and the target wavelength may be selected in the wide measurement wavelength range from the visible light range to the near-infrared range.

Second Embodiment

Next, the second embodiment will be explained.

In the above described first embodiment, the layered structures are formed by alternate stacking of the high-refractive layers and the low-refractive layers based on the same design center wavelengths and the first reflection film 23 and the second reflection film 24 are formed by stacking of the plurality of layered structures having the different design center wavelengths. On the other hand, the second embodiment is different from the above described first embodiment in that the layered structures formed by the layers having the same design center wavelength are not provided and the design center wavelengths are different in the respective high-refractive layers and low-refractive layers.

Note that, in the following explanation, the same signs are assigned to the items that have been already described and the explanation thereof may be omitted or simplified.

As described above, the difference between the embodiment and the first embodiment is in the film configurations of the first reflection film 23 and the second reflection film 24, and the basic configuration of the spectroscopic measuring apparatus 1 is the same as that of the first embodiment. That is, the spectroscopic measuring apparatus 1 of the embodiment includes the optical filter 10 having the first filter 20 and the second filter 30, the light receiving unit 40, and the control unit 50 like that of the first embodiment, and the detailed explanation thereof will be omitted.

Figure 9:
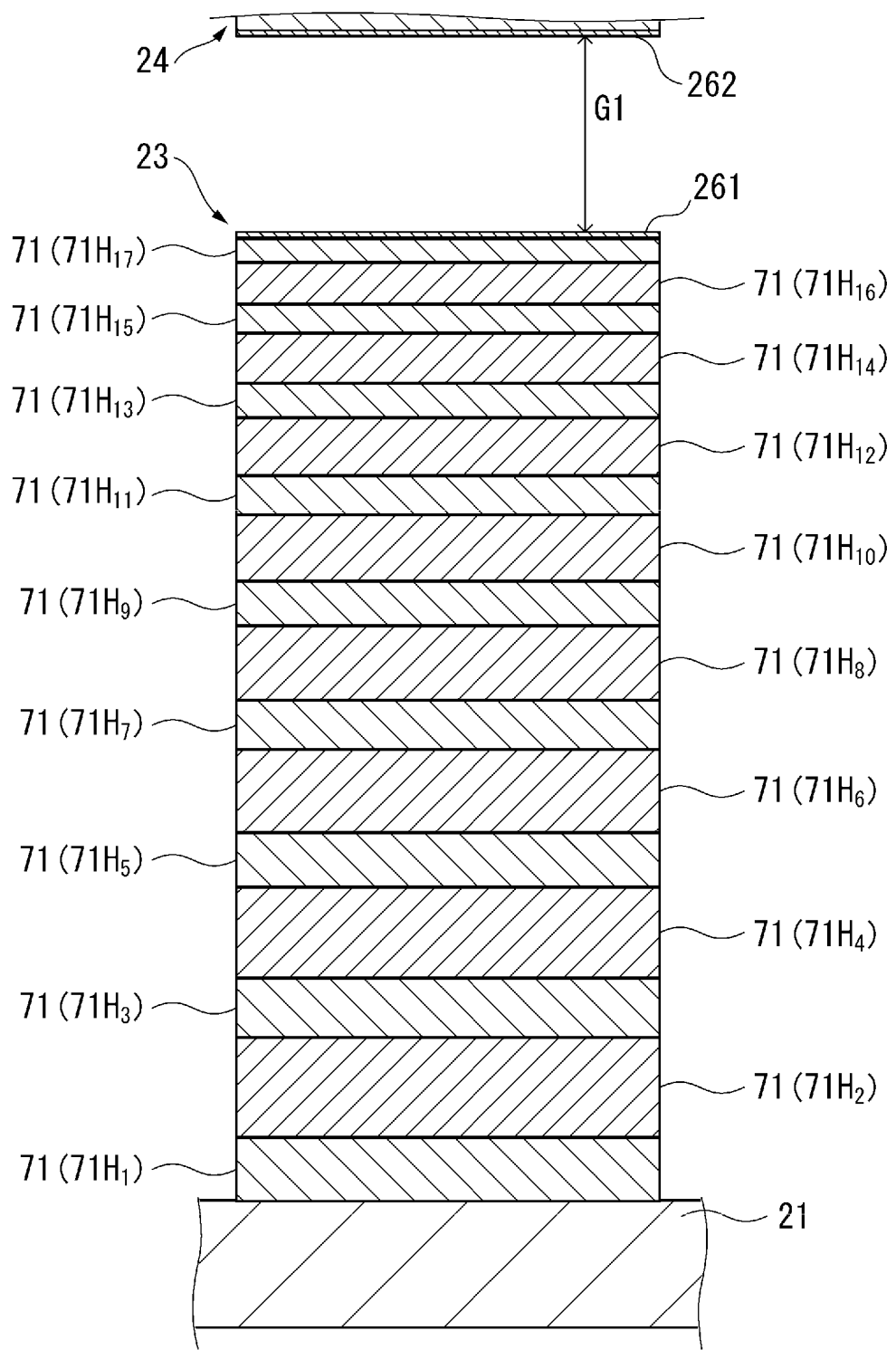
FIG. 9 is a sectional view showing a film configuration of a first reflection film and a second reflection film of a second embodiment.

FIG. 9 is the sectional view showing the film configuration of the first reflection film 23 of the embodiment. Note that the second reflection film 24 (not shown) has the same film configuration as the first reflection film 23.

In the embodiment, as shown in FIG. 9, the first reflection film 23 and the second reflection film 24 are formed using multilayer films in which a plurality of layers 71 are stacked. Specifically, the respective layers 71 include high-refractive layers 71H$_M$ and low-refractive layers 71L$_M$ and these high-refractive layers 71H$_M$ and low-refractive layers 71L$_M$ are alternately stacked. Here, indexes "M" show the sequence of stacking from the first substrate 21 and the second substrate 22. In the embodiment, as shown in FIG. 9, the layers placed in the positions closest to the first substrate 21 and the second substrate 22 are the high-refractive layers 71H$_1$ and the odd-numbered, i.e., M=(2m−1)th (m is an integer equal to or larger than 1) layers from the first substrate 21 and the second substrate 22 are the high-refractive layers 71H$_M$. Further, the even-numbered, i.e., M=(2m)th layers are low-refractive layers 71L$_M$. Note that, in FIG. 9, the example in which the high-refractive layers 71H$_1$ are placed in the positions near the first substrate 21 and the second substrate 22 is shown, however, the low-refractive layers 71L$_1$ may be placed in the positions near the first substrate 21 and the second substrate 22. In this case, when M=(2m−1), the low-refractive layers 71L$_M$ are placed and, when M=2m, the high-refractive layers 71H$_M$ are placed.

In the embodiment, the plurality of high-refractive layers 71H$_M$ and the plurality of low-refractive layers 71L$_M$ respectively have different optical film thicknesses and the optical film thicknesses are smaller toward the first gap G1. For example, when the plurality of high-refractive layers 71H$_M$ are formed using the same constituent material and have the same refractive index, the plurality of high-refractive layers 71H$_M$ are formed to have film thicknesses that gradually decrease toward the first gap G1. Similarly, when the plurality of low-refractive layers 71L$_M$ are formed using the same constituent material and have the same refractive index, the plurality of low-refractive layers 71L$_M$ are formed to have film thicknesses that gradually decrease toward the first gap G1.

More specifically, in the embodiment, design center wavelengths $\lambda_M$ of the respective layers 71 are set at equal intervals. That is, x∈M and a difference $(\lambda_x - \lambda_{x+1})$ between the design center wavelength $\lambda_x$ of the xth layer 71$_x$ and the design center wavelength $\lambda_{x+1}$ of the (x+1)th layer 71$_{x+1}$ takes a constant value $\Delta\lambda$. For example, in the example shown in FIG. 9, the optical film thickness is set with the design center wavelength of 1000 nm in the high-refractive layers 71H$_1$ placed in the positions closest to the first substrate 21 and the second substrate 22, and the optical film thickness is set with the design center wavelength of 960 nm in the low-refractive layers 71L$_2$ as the layers 71 placed secondly. Subsequently, with $\Delta\lambda$=40 nm, the design center wavelength is smaller toward the first gap G1 and, in the high-refractive layers 71H$_{17}$ placed at the positions closest to the first gap G1, the optical film thickness is set with the design center wavelength of 360 nm.

Next, the optical characteristics of the first filter 20 having the above described film configuration will be explained.

Figure 10:
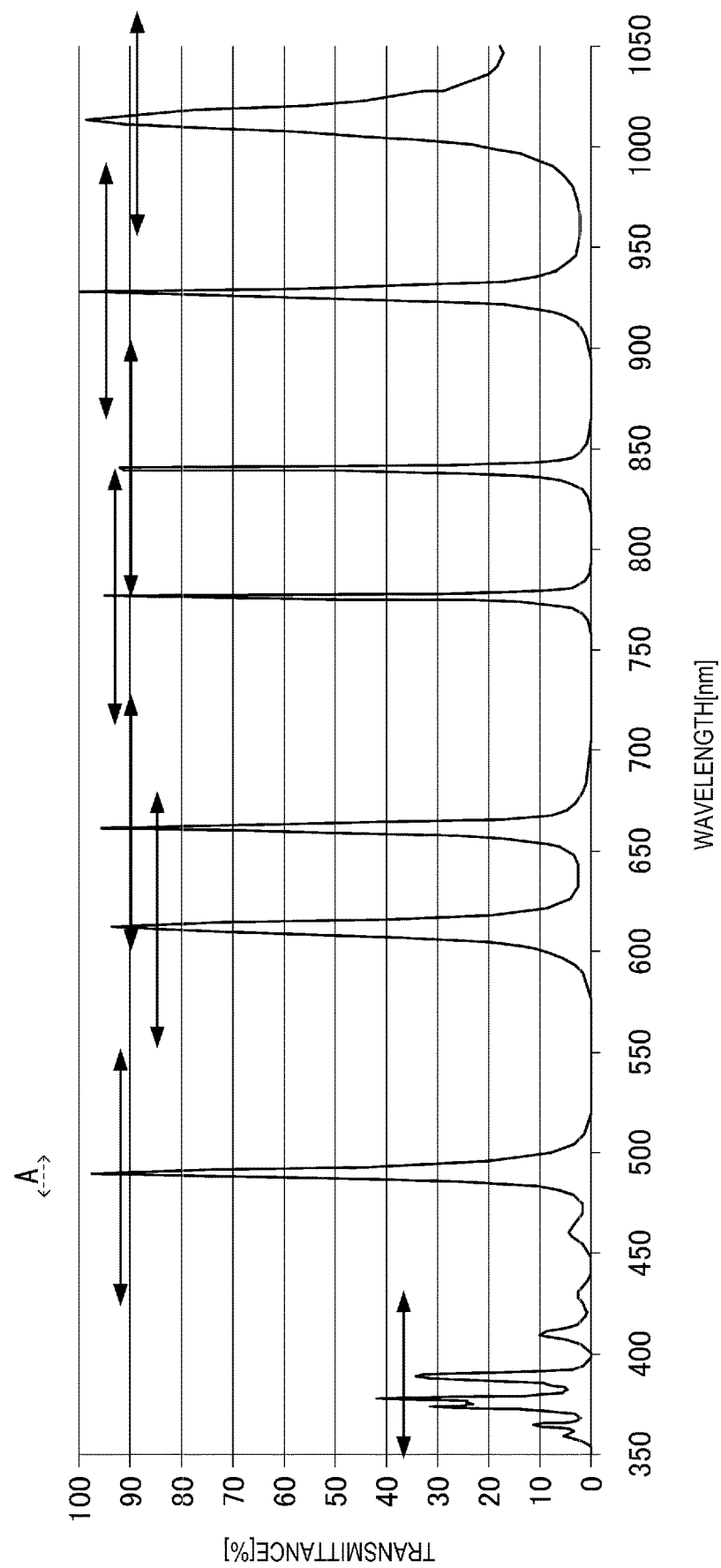
FIG. 10 shows optical characteristics of a first filter of the second embodiment.

FIG. 10 shows the optical characteristics of the first filter 20 of the second embodiment. Note that, in FIG. 10, double-headed arrows show shift ranges of the peak wavelengths when the first gap G1 is changed.

As shown in FIG. 10, in the optical characteristics of the first filter 20 of the embodiment, a plurality of peak wavelength having narrow half-band widths appear in the wide measurement wavelength range from the visible light range to the near-infrared range (from about 400 nm to about 1000 nm) like those of the first embodiment. In this regard, the difference $\Delta\lambda$ in design center wavelength between the adjacent layers 71 is set to the constant value, and thereby, the wavelength intervals between the plurality of peak wavelengths are substantially equal and, e.g. a portion in which the wavelength intervals between the peak wavelengths are narrower is not produced in a part at the short wavelength side or a part at the long wavelength side.

In the embodiment, like the first embodiment, when the first gap G1 is reduced, the respective peak wavelengths entirely shift toward the short wavelength side and, when the first gap G1 is increased, the respective peak wavelengths entirely shift toward the long wavelength side.

Therefore, like the first embodiment, the first filter 20 and the second filter 30 are combined, and thereby, only the light at the target wavelength from the wide measurement wavelength range from the visible light range to the near-infrared range may be transmitted from optical filter 10.

Functions and Effects of Embodiment

The first filter 20 of the embodiment includes the first reflection film 23 and the second reflection film 24 facing each other via the first gap G1 and the first actuator 25 that changes the dimension of the first gap G1 like that of the first embodiment. Further, the first reflection film 23 and the second reflection film 24 of the embodiment are formed using the multilayer films formed by alternate stacking of the high-refractive layers $H_M$ and the low-refractive layers $L_M$, the optical film thicknesses of the respective layers 71 are the film thicknesses based on the design center wavelengths $\lambda_M$ different with respect to each layer 71, and the design center wavelengths $\lambda_M$ are smaller toward the first gap G1.

Thereby, like the first embodiment, the light at the peak wavelength according to the dimension of the first gap G1 may be transmitted from the first filter 20 and, for example, the peak wavelength appears in the wide measurement wavelength range from the visible light range to the near-infrared range. Further, in the transmission characteristics of the lights at the respective peak wavelengths, the half-band widths are sufficiently small with respect to the wavelength-tunable interference filter using the metal films as reflection films like the second filter 30 and the wavelength resolution is very high. Therefore, the plurality of peak wavelengths output from the first filter 20 are appropriately selected, and thereby, the light at the desired target wavelength may be spectroscopically separated and transmitted with high accuracy from the wide measurement wavelength range.

Further, in the embodiment, the differences in design center wavelength $\lambda_M$ between the adjacent layers 71 take the constant value $\Delta\lambda$. In this case, as shown in FIG. 10, in the optical characteristics of the first filter 20, the wavelength intervals between the adjacent peak wavelengths are substantially uniform. Thus, inconvenience that the spectroscopic accuracy is lower when part of the wavelength intervals are narrower or inconvenience that a wavelength is not settable as the target wavelength when part of the wavelength intervals are wider may be suppressed.

Modified Examples

The present disclosure is not limited to the above described embodiments, but includes modifications, alterations, etc. within the range in which the purposes of the present disclosure may be achieved.

Modified Example 1

In the above described second embodiment, the design center wavelengths $\lambda_M$ of the respective layers 71 are set so that the differences in design center wavelength $\lambda_M$ between the adjacent layers 71 may take the constant value.

On the other hand, the differences in design center wavelength $\lambda_M$ between the adjacent layers 71 do not necessarily take a constant value. For example, the design center wavelengths $\lambda_M$ of the respective layers 71 may be set so that the differences in design center wavelength $\lambda_M$ between the adjacent layers 71 may be gradually smaller toward the first gap G1, and the optical film thicknesses of the respective layers 71 may be set based on the design center wavelengths $\lambda_M$.

Figure 11:
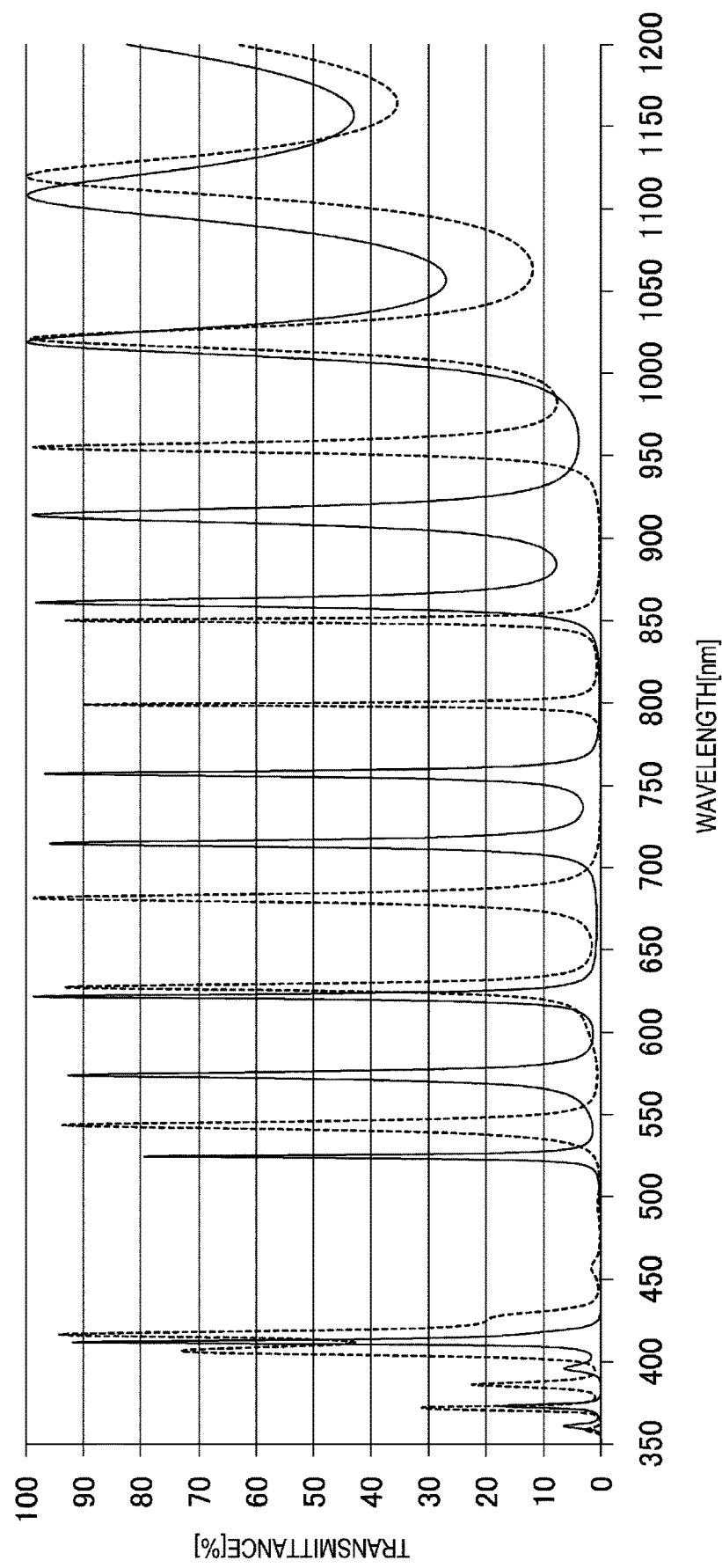
FIG. 11 shows optical characteristics of a first filter of Modified example 1.

In a specific example, in the film configurations of the first reflection film 23 and the second reflection film 24 as shown in FIG. 9, in the first to sixth layers 71 from the first substrate 21 and the second substrate 22, the design center wavelengths $\lambda_M$ of the respective layers 71 are set so that the differences in design center wavelength $\lambda_M$ between the adjacent layers 71 may be 60 nm. Further, in the sixth to twelfth layers 71, the design center wavelengths $\lambda_M$ of the respective layers 71 are set so that the differences may be 40 nm. Furthermore, in the twelfth to seventeenth layers 71, the design center wavelengths $\lambda_M$ of the respective layers 71 are set so that the differences may be 40 nm. FIG. 11 shows the optical characteristics of the first filter 20 in this case. Note that, in FIG. 11, the broken line shows the optical characteristics of the first filter 20 of the second embodiment and the solid line shows the optical characteristics of the first filter 20 of Modified example 1.

As shown in FIG. 11, also, in the first filter 20 of Modified example 1, like the first embodiment and the second embodiment, the wide band range of about 600 nm from the visible light range to the near-infrared range may be used as the measurement wavelength range, and the plurality of peak wavelengths having small half-band widths appear within the measurement wavelength range. Further, the wavelength intervals of the respective peak wavelengths are larger than those of the transmission wavelength range A of the second filter 30 and the respective peak wavelengths are located substantially equally. Therefore, like the first embodiment and the second embodiment, the plurality of peak wavelengths output from the first filter 20 are appropriately selected, and thereby, the light at the desired target wavelength may be spectroscopically separated and transmitted with high accuracy from the wide measurement wavelength range.

On the other hand, in Modified example 1, compared to the second embodiment, the transmittance at the long wavelength side is entirely higher and a certain amount of light in the wavelength range between the peak wavelengths is transmitted, however, the half-band widths are smaller at the peak wavelengths at the short wavelength side. That is, in the embodiment, particularly when the spectroscopic measurement at the short wavelength side is performed, the measurement with high accuracy can be performed.

Modified Example 2

In the second embodiment, the design center wavelengths $\lambda_M$ of the respective layers 71 may be set so that the differences in design center wavelength $\lambda_M$ between the adjacent layers 71 may be gradually larger toward the first gap G1, and the optical film thicknesses of the respective layers 71 may be set based on the design center wavelengths $\lambda_M$.

Figure 12:
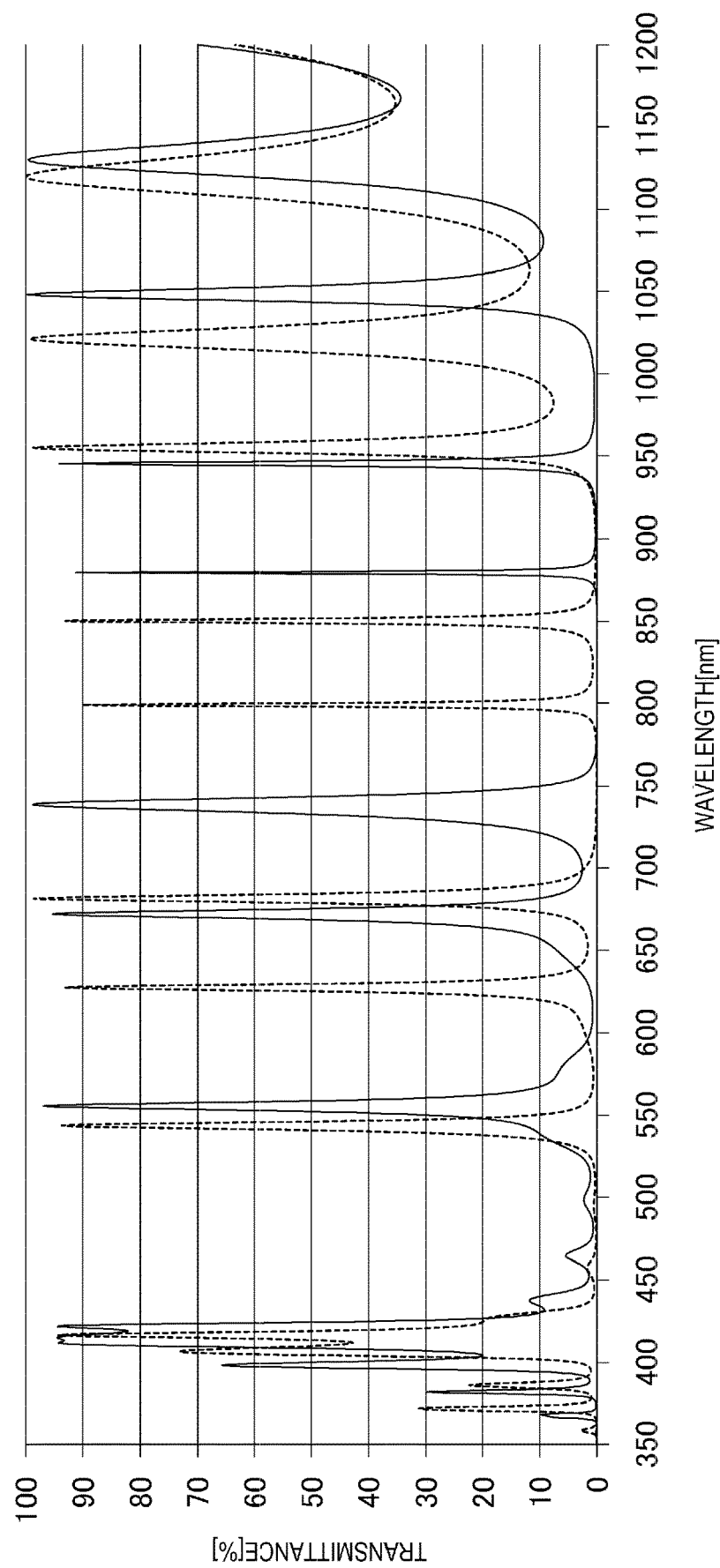
FIG. 12 shows optical characteristics of a first filter of Modified example 2.

In a specific example, in the film configurations of the first reflection film 23 and the second reflection film 24 as shown in FIG. 9, in the first to sixth layers 71 with reference to the first substrate 21 and the second substrate 22, the design center wavelengths $\lambda_M$ of the respective layers 71 are set so that the differences in design center wavelength $\lambda_M$ between the adjacent layers 71 may be 20 nm. Further, in the sixth to twelfth layers 71, the design center wavelengths $\lambda_M$ of the respective layers 71 are set so that the differences may be 40 nm. Furthermore, in the twelfth to seventeenth layers 71, the design center wavelengths $\lambda_M$ of the respective layers 71 are set so that the differences may be 60 nm. FIG. 12 shows the optical characteristics of the first filter 20 in this case. Note that, in FIG. 12, the broken line shows the optical characteristics of the first filter 20 of the second embodiment and the solid line shows the optical characteristics of the first filter 20 of Modified example 2.

As shown in FIG. 12, also, in the first filter 20 of Modified example 2, like the first embodiment and the second embodiment, the wide band range of about 600 nm from the visible light range to the near-infrared range may be used as the measurement wavelength range, and the plurality of peak wavelengths having small half-band widths appear within the measurement wavelength range. Further, the wavelength intervals of the respective peak wavelengths are larger than those of the transmission wavelength range A of the second filter 30 and the respective peak wavelengths are located substantially equally. Therefore, like the first embodiment and the second embodiment, the plurality of peak wavelengths output from the first filter 20 are appropriately selected, and thereby, the light at the desired target wavelength may be spectroscopically separated and transmitted with high accuracy from the wide measurement wavelength range.

On the other hand, in Modified example 2, compared to the second embodiment, the transmittance at the short wavelength side is entirely higher and the wavelength intervals of the peak wavelengths are narrower, however, the half-band widths are smaller than those of the second embodiment in the peak wavelengths at the long wavelength side and the transmittance in the wavelength range between the peak wavelengths is lower. That is, in the embodiment, particularly when the spectroscopic measurement at the long wavelength side is performed, the measurement with high accuracy can be performed.

Modified Example 3

In the first embodiment, the example in which the first high-refractive layers 61H, the second high-refractive layers 62H, and the third high-refractive layers 63H are formed using the same material and the first low-refractive layers 61L, the second low-refractive layers 62L, the third low-refractive layers 63L, the first coupling layers 64, and the second coupling layers 65 are formed using the same material is shown. On the other hand, the first high-refractive layers 61H, the second high-refractive layers 62H, and the third high-refractive layers 63H may be formed using different materials. Similarly, the first low-refractive layers 61L, the second low-refractive layers 62L, the third low-refractive layers 63L, the first coupling layers 64, and the second coupling layers 65 may be formed using different materials.

Or, the two first high-refractive layers 61H forming the first layered structure 61 may be formed using different materials. The same applies to the second layered structure 62 and the third layered structure 63, and the two second high-refractive layers 62H may be formed using different materials, and the two third high-refractive layers 63H may be formed using different materials.

Further, the configuration in which the first layered structure 61 is formed by the two first high-refractive layers 61H and the one first low-refractive layer 61L is exemplified, however, for example, a plurality of the first low-refractive layers 61L may be provided. In this case, the respective first low-refractive layers 61L may be formed using different materials. Note that the same applies to the second layered structure 62 and the third layered structure 63.

That is, the first layered structure 61, the second layered structure 62, and the third layered structure 63 may have configurations in which high-refractive layers and low-refractive layers having lower refractive indices than the high-refractive layers are alternately stacked and the optical film thicknesses of the respective layers may be film thicknesses as one-fourths of design center wavelengths (first design center wavelength $\lambda_1$, second design center wavelength $\lambda_2$, and third design center wavelength $\lambda_3$) set with respect to each of the layered structures 61, 62, 63.

Similarly, in the second embodiment, as long as the high-refractive layers $71H_M$ and low-refractive layers $71L_M$ are alternately stacked, the materials forming the respective high-refractive layers $71H_M$ and the materials forming the low-refractive layers $71L_M$ may be respectively different. The film thicknesses may be set so that the optical film thicknesses of the respective layers 71 may be one-fourth the design center wavelengths $\lambda_M$ set with respect to each of the respective layers 71.

Modified Example 4

In the first embodiment, the example in which the respective layered structures 61, 62, 63 are alternately stacked in the order of the high-refractive layers and the low-refractive layers from the first substrate 21 and second substrate 22 sides is shown, however, the configurations are not limited to those. For example, the layered structures may be formed by alternate stacking in the order of the low-refractive layers and the high-refractive layers. Note that the same applies to the second embodiment.

Further, in the first embodiment, the layer of the first layered structure 61 placed in the position closest to the second layered structure 62 is the high-refractive layer 61H, and accordingly, the first coupling layer 64 coupling the first layered structure 61 and the second layered structure 62 is formed by the low-refractive layer. On the other hand, when the layer of the first layered structure 61 placed in the position closest to the second layered structure 62 is the first low-refractive layer 61L, the first coupling layer 64 is preferably formed by a high-refractive layer. Further, in this case, the layer of the second layered structure 62 placed in the position closest to the first layered structure 61 is preferably the second low-refractive layer 62L. Note that the same applies to the second coupling layer 65.

Modified Example 5

In the first embodiment, the example in which the first layered structure 61 and the second layered structure 62 are coupled by the first coupling layer 64 and the second layered structure 62 and the third layered structure 63 are coupled by the second coupling layer 65 is shown. On the other hand, none of the first coupling layer 64 and the second coupling layer 65 may be provided and the second layered structure 62 may be stacked directly on the first layered structure 61 and the third layered structure 63 may be stacked directly on the second layered structure 62.

Modified Example 6

In the above described first embodiment, the optical filter 10 includes the second filter 30 as the wavelength range setting filter, however, is not limited to that.

For example, the optical filter 10 may include a plurality of bandpass filters that transmit lights in predetermined narrow band ranges as wavelength range setting filters and may change the bandpass filters placed on the optical axis O of the light receiving unit 40 according to the target wavelength.

Modified Example 7

In the above described first embodiment, the configuration in which the optical filter 10 includes the first filter 20 placed at the light incident side of the measurement light and the second filter 30 placed to face the light receiving unit 40 is exemplified, however, the optical filter is not limited to that.

For example, the optical filter 10 may include the second filter 30 placed at the light incident side of the measurement light and the first filter 20 placed to face the light receiving unit 40.

What is claimed is:

1. An optical filter comprising:
a pair of reflection films facing each other via a gap; and
an actuator that changes a distance between the pair of reflection films,
wherein each of the reflection films are formed of a plurality of layered structures,
the plurality of layered structures of each reflective film are respectively formed by sandwiching a low-refractive layer with a pair of high-refractive layers, wherein the low-refractive layer has a smaller refractive index than the pair of high-refractive layers,
in each of the respective layered structures of each reflective film, optical film thicknesses of the high-refractive layers and optical film thicknesses of the low-refractive layers are film thicknesses are based on a predetermined design center wavelength that is set with respect to that particular layered structure,
the design center wavelengths in each of the layered structures of a respective reflective film are different,
the plurality of layered structures are coupled by light-transmissive coupling layers, and
optical film thicknesses of the coupling layers are film thicknesses based on averages of the design center wavelengths of pairs of the layered structures with the coupling layers in between.

2. The optical filter according to claim 1, wherein the design center wavelengths of the plurality of layered structures are shorter as the layered structures are closer to the gap.

3. The optical filter according to claim 1, wherein a wavelength range setting filter that transmits a light in a predetermined wavelength range is provided on an optical axis of the pair of reflection films.

4. The optical filter according to claim 3, wherein the wavelength range setting filter includes a pair of metal reflection films facing each other along the optical axis and a transmission wavelength range change portion that changes a dimension between the pair of metal reflection films.

5. An electronic apparatus comprising:
the optical filter according to claim 1; and
a control unit that controls the actuator.

6. An optical filter comprising:
a pair of reflection films facing each other via a gap; and
an actuator that changes a distance between the pair of reflection films, wherein
each of the reflection films are formed by a multilayer film in which a low-refractive layer is sandwiched by a pair of high-refractive layers, and
in each of the multilayer films of each reflective film, optical film thicknesses of the high-refractive layers and optical film thicknesses of the low-refractive layers are film thicknesses are based on a design center wavelength that is set with respect to that particular multilayer film, and
the design center wavelength in each of the multilayer films of a respective reflective film are different, and the design center wavelengths are smaller toward the gap, and
a difference between the design center wavelengths of the adjacent layers takes a constant value.

* * * * *